(12) United States Patent
Zeller et al.

(10) Patent No.: US 10,598,007 B2
(45) Date of Patent: Mar. 24, 2020

(54) ADVANCED PASSIVE INTERFERENCE MANAGEMENT IN DIRECTIONAL DRILLING SYSTEM, APPARATUS AND METHODS

(71) Applicant: Merlin Technology, Inc., Kent, WA (US)

(72) Inventors: Rudolf Zeller, Seattle, WA (US); Gary Garrabrant, Seattle, WA (US); Timothy Bayliss, Maple Valley, WA (US); Scott Phillips, Kent, WA (US)

(73) Assignee: Merlin Technology, Inc., Kent, WA (US)

( * ) Notice: Subject to any disclaimer, the term of this patent is extended or adjusted under 35 U.S.C. 154(b) by 0 days.

(21) Appl. No.: 16/538,038

(22) Filed: Aug. 12, 2019

(65) Prior Publication Data

US 2019/0360328 A1 Nov. 28, 2019

Related U.S. Application Data

(62) Division of application No. 15/635,884, filed on Jun. 28, 2017, now Pat. No. 10,378,338.

(51) Int. Cl.
*E21B 47/04* (2012.01)
*E21B 47/12* (2012.01)
(Continued)

(52) U.S. Cl.
CPC ............ *E21B 47/122* (2013.01); *E21B 7/046* (2013.01); *E21B 47/024* (2013.01); *E21B 47/02216* (2013.01); *E21B 47/101* (2013.01)

(58) Field of Classification Search
None
See application file for complete search history.

(56) References Cited

U.S. PATENT DOCUMENTS 2,251,817 A * 8/1941 Athy ................ G01V 1/46
367/29
3,292,143 A * 12/1966 Russell ............ G01V 1/44
367/30

(Continued)

FOREIGN PATENT DOCUMENTS

EP 0873465 A1 10/1998
JP 02021289 1/1990
(Continued)

OTHER PUBLICATIONS

Digital Control Incorporated, DigiTrak Mark III Directional Drilling Locating System Operator's Manual, May 2008, Kent, Washington.
(Continued)

*Primary Examiner* — John F Mortell
(74) *Attorney, Agent, or Firm* — Pritskau Patent Group LLC

(57) ABSTRACT

A transmitter for inground use controls a depth signal transmit power in relation to a data signal transmit power such that one reception range of the depth signal at least approximately matches another, different reception range of the data signal. A portable device can form a system with the transmitter in which the portable device scans a plurality of frequencies within at least one low frequency depth signal range to measure the electromagnetic noise at each one of the plurality of frequencies and identify at least one of the frequencies as a potential depth frequency for the transmitter. The portable device can include a dual mode filter having a rebar mode and a normal mode filter. The depth signal frequency is dynamically positionable in relation to low frequency noise.

8 Claims, 22 Drawing Sheets

(51) Int. Cl.
*E21B 7/04* (2006.01)
*E21B 47/024* (2006.01)
*E21B 47/022* (2012.01)
*E21B 47/10* (2012.01)

(56) References Cited

U.S. PATENT DOCUMENTS

| | | | | |
|---|---|---|---|---|
| 3,402,348 | A | * | 9/1968 | Hoehn, Jr. ............... G01V 3/26 324/346 |
| 4,041,443 | A | * | 8/1977 | Thigpen ................. G01V 1/247 367/45 |
| 4,351,027 | A | * | 9/1982 | Gay .................... E21B 41/0014 114/144 B |
| 4,608,480 | A | * | 8/1986 | Bizot ................... B23K 26/389 219/121.7 |
| 4,636,758 | A | * | 1/1987 | Mettoudi ............... H03B 19/18 333/218 |
| 5,204,673 | A | | 4/1993 | Kyle et al. |
| 5,361,029 | A | | 11/1994 | Rider et al. |
| 5,663,589 | A | | 9/1997 | Saitoh et al. |
| 5,720,354 | A | | 2/1998 | Stump et al. |
| 5,963,042 | A | | 10/1999 | Suyama et al. |
| 6,005,532 | A | | 12/1999 | Ng |
| 6,285,190 | B1 | | 9/2001 | Brune et al. |
| 6,417,666 | B1 | | 7/2002 | Mercer |
| 6,496,008 | B1 | | 12/2002 | Brune et al. |
| 6,606,032 | B1 | | 8/2003 | Fling |
| 6,727,704 | B2 | | 4/2004 | Brune et al. |
| 6,737,867 | B2 | | 5/2004 | Brune et al. |
| 6,756,783 | B2 | | 6/2004 | Brune et al. |
| 6,985,750 | B1 | | 1/2006 | Vicknair et al. |
| 7,106,194 | B2 | | 9/2006 | Nelson |
| 7,151,375 | B2 | | 12/2006 | Mercer et al. |
| 7,242,225 | B2 | | 7/2007 | Klage |
| 7,331,409 | B2 | | 2/2008 | Cole et al. |
| 7,495,445 | B2 | | 2/2009 | Mercer |
| 7,624,816 | B2 | | 12/2009 | Cole et al. |
| 7,786,731 | B2 | | 8/2010 | Cole et al. |
| 7,926,589 | B2 | | 4/2011 | Mercer |
| 8,305,229 | B1 | | 11/2012 | Gard |
| 8,729,901 | B2 | | 5/2014 | Lam et al. |
| 8,981,780 | B2 | | 3/2015 | Cole et al. |
| 9,274,243 | B2 | | 3/2016 | Chau et al. |
| 9,540,879 | B2 | | 1/2017 | Kolpack et al. |
| 9,739,140 | B2 | | 8/2017 | Zeller et al. |
| 2002/0105331 | A1 | | 8/2002 | Brune et al. |
| 2004/0189305 | A1 | | 9/2004 | Brune et al. |
| 2006/0055556 | A1 | | 3/2006 | Memarzadeh et al. |
| 2006/0132136 | A1 | | 6/2006 | Mizuno |
| 2007/0040558 | A1 | | 2/2007 | Overby et al. |
| 2008/0315879 | A1 | | 12/2008 | Saha |
| 2010/0060285 | A1 | | 3/2010 | Pearson et al. |
| 2013/0106615 | A1 | | 5/2013 | Prammer |
| 2013/0118810 | A1 | | 5/2013 | Mercer |
| 2013/0175092 | A1 | | 7/2013 | Kolpack et al. |
| 2013/0176139 | A1 | | 7/2013 | Chau et al. |
| 2014/0144704 | A1 | | 5/2014 | Cole et al. |
| 2014/0266771 | A1 | | 9/2014 | Chau et al. |
| 2015/0369953 | A1 | | 12/2015 | Bailey et al. |
| 2016/0069180 | A1 | | 3/2016 | Zeller et al. |
| 2019/0017366 | A1 | | 1/2019 | Alaas et al. |

FOREIGN PATENT DOCUMENTS

| | | |
|---|---|---|
| JP | 2003078500 A | 3/2003 |
| WO | 2013062949 A1 | 5/2013 |
| WO | 2013103875 A1 | 7/2013 |

OTHER PUBLICATIONS

English and Google translations of the reference: The First Office Action of the State Intellectual Property Office of People's Republic of China for Chinese Application No. 201510696502.7 which is associated with U.S. Appl. No. 12/497,990, dated May 17, 2017.
English Translation of the reference: Shen Wei et al., "Design of HF Radar System with Noise Spectrum Monitoring", Systems Engineering and Electronics, vol. 29, No. 10, pp. 1635-1637, Received Mar. 7, 2018.
English translation of the reference: The Second Office Action of the State Intellectual Property Office of People's Republic of China for Chinese Application No. 201510696502.7 which is associated with U.S. Appl. No. 12/497,990, dated Mar. 22, 2018.
Extended European Search Report for European Application No. 15838319.0 which is associated with International Application No. PCT/US2015/048692 which is associated with U.S. Appl. No. 14/845,231, dated Mar. 16, 2018, Munich, Germany.
International Preliminary Report on Patentability for International Application No. PCT/US2015/048692 which is associated with U.S. Appl. No. 14/845,231, dated Dec. 7, 2016, Moscow, Russia.
Office Action for U.S. Appl. No. 15/685,790, dated Feb. 13, 2019.
Office Action for U.S. Appl. No. 15/676,057 dated Apr. 12, 2019.
Office Action in U.S. Appl. No. 14/277,873, dated Feb. 4, 2019.
Prosecution History of U.S. Appl. No. 12/497,990 (issued as U.S. Pat. No. 8,729,901) as of Jul. 23, 2018.
Prosecution History of U.S. Appl. No. 14/277,873, as of Jul. 23, 2018.
Prosecution History of U.S. Appl. No. 14/845,231 (now issued as U.S. Pat. No. 9,739,140), as of Jul. 23, 2018.
Prosecution History of U.S. Appl. No. 15/676,057, as of Jul. 23, 2018.
Prosecution History of U.S. Appl. No. 15/685,790, as of Jul. 23, 2018.
Shen Wei et al., "Design of HF Radar System with Noise Spectrum Monitoring", Systems Engineering and Electronics, vol. 29, No. 10, pp. 1635-1637, Oct. 2007. (English translation of Abstract only).
Simon et al, Digital Communication Techniques, 1995, PTR Prentice Hall, Englewood Cliffs, New Jersey 07632, Chapter 4, p. 178-201.
The First Office Action of the State Intellectual Property Office of People's Republic of China for Chinese Application No. 201510696502.7 which is associated with U.S. Appl. No. 12/497,990, dated May 17, 2017. (Machine translation included).
The First Office Action of the State Intellectual Property Office of People's Republic of China for Chinese Application No. 201580046941.1 which is associated with International Application No. PCT/US2015/048692 which is associated with U.S. Appl. No. 14/845,231, dated Jan. 3, 2018. (Machine translation included).
The First Office Action of the State Intellectual Property Office of People's Republic of China for Chinese Application No. 201010142007.9 which is associated with U.S. Appl. No. 12/497,990, dated Oct. 26, 2012. (English translation included).
The Fourth Office Action of the State Intellectual Property Office of People's Republic of China for previously cited: Chinese Application No. 201510696502.7 which is associated with U.S. Appl. No. 12/497,990, dated May 13, 2019 (English Translation Included).
The International Search Report and the Written Opinion of the International Searching Authority for International Application No. PCT/US2015/048692 which is associated with U.S. Appl. No. 14/845,231, dated Dec. 10, 2015, Moscow, Russia.
The International Search Report and Written Opinion for PCT Application No. PCT/US2018/034207 which is associated with U.S. Appl. No. 15/635,884, dated Sep. 13, 2018.
The Second Office Action of the State Intellectual Property Office of People's Republic of China for Chinese Application No. 201580046941.1 which is associated with International Application No. PCT/US2015/048692 which is associated with U.S. Appl. No. 14/845,231, dated Mar. 19, 2018. (Machine translation included).
The Second Office Action of the State Intellectual Property Office of People's Republic of China for Chinese Application No. 201510696502.7 which is associated with U.S. Appl. No. 12/497,990, dated Jan. 19, 2018. (English translation included).
The Second Office Action of the State Intellectual Property Office of People's Republic of China for Chinese Application No. 201010142007.9 which is associated with U.S. Appl. No. 12/497,990, dated Sep. 6, 2013. (English translation).

(56) References Cited

OTHER PUBLICATIONS

The Third Office Action of the State Intellectual Property Office of People's Republic of China for previously cited: Chinese Application No. 201510696502.7 which is associated with U.S. Appl. No. 12/497,990, dated Sep. 17, 2018 (English Translation Included).
Updated Prosecution History of U.S. Appl. No. 14/277,873, as of Apr. 17, 2019.
Updated Prosecution History of U.S. Appl. No. 14/277,873, as of Feb. 16, 2019.
Updated Prosecution History of U.S. Appl. No. 15/685,790, as of Apr. 17, 2019.
Wanshun Wang, et al, Research and Information System of High-Resolution Underground Pipeline Detection Technology, Aug. 2005.
Updated Prosecution History of U.S. Appl. No. 15/685,790, as of Oct. 23, 2019.
Updated Prosecution History of U.S. Appl. No. 14/277,873, as of Oct. 23, 2019.

\* cited by examiner

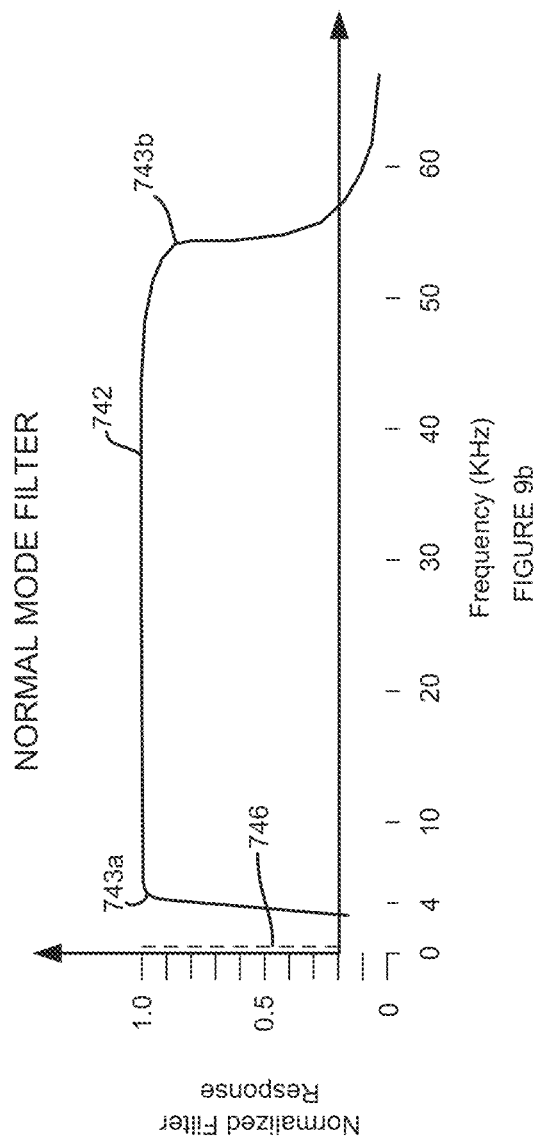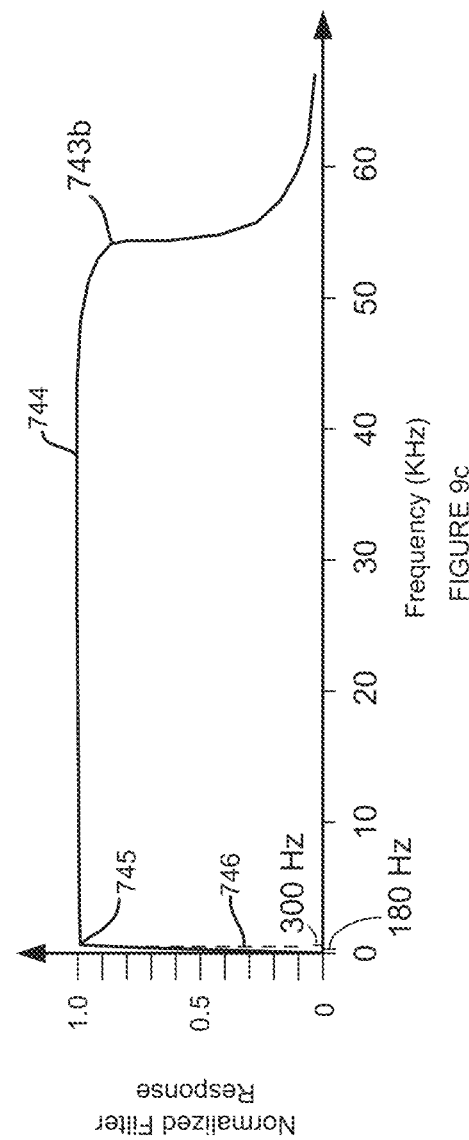

ADVANCED PASSIVE INTERFERENCE MANAGEMENT IN DIRECTIONAL DRILLING SYSTEM, APPARATUS AND METHODS

RELATED APPLICATIONS

This application is a divisional application of copending U.S. patent application Ser. No. 15/635,884 filed on Jun. 28, 2017, the disclosure of which is hereby incorporated by reference in its entirety.

BACKGROUND

The present application is generally related to the field of communications relating to an inground device and, more particularly, to advanced passive interference management in a directional drilling system, apparatus and associated methods.

A technique that is often referred to as horizontal directional drilling (HDD) can be used for purposes of installing a utility without the need to dig a trench. A typical utility installation involves the use of a drill rig having a drill string that supports a boring tool at a distal or inground end of the drill string. The drill rig forces the boring tool through the ground by applying a thrust force to the drill string. The boring tool is steered during the extension of the drill string to form a pilot bore. Upon completion of the pilot bore, the distal end of the drill string is attached to a pullback apparatus which is, in turn, attached to a leading end of the utility. The pullback apparatus and utility are then pulled through the pilot bore via retraction of the drill string to complete the installation. In some cases, the pullback apparatus can comprise a back reaming tool which serves to expand the diameter of the pilot bore ahead of the utility so that the installed utility can be of a greater diameter than the original diameter of the pilot bore.

Steering of a boring tool can be accomplished in a well-known manner by orienting an asymmetric face of the boring tool for deflection in a desired direction in the ground responsive to forward movement. In order to control this steering, it is desirable to monitor the orientation of the boring tool based on sensor readings obtained by sensors that form part of an electronics package that is supported by the boring tool. The sensor readings, for example, can be modulated onto a locating signal that is transmitted by the electronics package for reception above ground by a portable locator or other suitable above ground device. In some systems, the electronics package can couple a carrier signal modulated by the sensor readings onto the drill string to then transmit the signal to the drill rig by using the drill string as an electrical conductor. Irrespective of the manner of transmission of the sensor data and for a given amount of transmission power, there is a limited transmission range at which the sensor data can be recovered with sufficient accuracy. The transmission range can be further limited by active interference and passive interference. Active interference generally consists of sources of electromagnetic signals present in the operational region that can overwhelm the signal being transmitted by the system. Conversely, passive interference serves to block or distort the transmitted signal, which can lead to reduced range or, in some cases, inaccurate readings. One common source of passive interference is rebar. In addressing the deficiencies of the prior art, Applicants filed commonly owned U.S. patent application Ser. No. 14/845,231 (hereinafter the '231 Application), entitled COMMUNICATION PROTOCOL IN DIRECTIONAL DRILLING SYSTEM, APPARATUS AND METHOD UTILIZING MULTI-BIT DATA SYMBOL TRANSMISSION, which is hereby incorporated by reference in its entirety. The '231 Application is submitted to provide sweeping benefits over the then-existing state-of-the-art and continues to provide such improvements, however, the present Application brings to light still further advances and improvements particularly with respect to passive interference, as will be discussed in detail at appropriate points hereinafter.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect of the disclosure, a transmitter and associated method are described for use in conjunction with a horizontal directional drilling system that includes a drill string that extends from a drill rig to an inground tool which supports the transmitter such that extension and retraction of the drill string moves the inground tool through the ground during an inground operation. The transmitter includes an antenna and one or more sensors for generating sensor data. An antenna driver electrically drives the antenna to emit a depth signal responsive to a depth drive input for aboveground reception for use in determining a depth of the inground tool and for electrically driving the antenna responsive to a data drive input to emit at least one data signal characterizing the sensor data using at least one data signal frequency, that is higher in frequency than the depth signal, for aboveground recovery of the sensor data. A processor is configured for generating the depth drive input at the depth signal frequency and for generating the data drive input, characterizing the sensor data, in a way that controls a depth signal transmit power in relation to a data signal transmit power such that one range of the depth signal at least approximately matches another, different reception range of the data signal.

In another aspect of the disclosure, an antenna driver electrically drives the antenna of the transmitter to emit a depth signal responsive to a depth drive signal for aboveground reception to determine a depth of the inground tool and electrically drives the antenna, to emit a data signal characterizing the sensor data using at least one data signal frequency, that is higher in frequency than the depth signal, for aboveground recovery of the sensor data. A processor is configured for generating the depth drive signal at a depth signal frequency and to generate the data drive signal at the data signal frequency to control one reception range of the depth signal in relation to another, different reception range of the data signal.

In still another aspect of the disclosure, a system, portable device and an associated method are described in which a transmitter is configured to move through the ground in a region during an operational procedure while transmitting a depth signal at a depth frequency that is selectable in a depth signal frequency range below 1 KHz to provide at least some immunity to passive interference and which is also subject to electromagnetic noise that can vary within the region. A portable device is configured to scan a plurality of frequencies within the depth signal frequency range to measure the electromagnetic noise at each one of the plurality of frequencies and identify a lowest one of the frequencies as a potential depth frequency which satisfies a low noise requirement based on the measured noise.

In a continuing aspect of the disclosure, a portable device serves as part of a system in which a transmitter is configured to move through the ground in a region during an operational procedure while transmitting a depth signal at a depth frequency. The portable device includes an antenna for receiving the depth signal to produce an output. A receiver is configured to measure the electromagnetic noise based on the antenna output in at least two different frequency bands below 1 KHz by incrementally scanning each frequency band to generate a plurality of incremental noise readings across each frequency band and display one or more potential depth frequencies for each frequency band based on the incremental noise readings for selection by an operator of one of the potential depth frequencies as the depth frequency for the depth signal.

In another aspect of the disclosure, a system and associated method are described in which a transmitter is configured to move through the ground in a region during an operational procedure while transmitting a depth signal at a depth frequency that is selectable in a depth signal frequency range below 1 KHz to provide at least some immunity to passive interference and which is also subject to electromagnetic noise below 1 KHz that can vary within the region. A portable device is configured to measure the electromagnetic noise in at least two different frequency bands below 1 KHz by incrementally scanning each frequency band to generate a plurality of incremental noise readings across each frequency band and display one or more potential depth frequencies for each frequency band based on the incremental noise readings for selection by an operator of one of the potential depth frequencies as the depth frequency.

In a further aspect of the present disclosure, a portable device and associated method are described as part of a system in which a transmitter is configured to move through the ground in a region during an operational procedure while transmitting a depth signal at a depth frequency and a data stream at one or more data frequencies that at least characterizes an orientation parameter of the transmitter. The portable device includes an antenna for receiving the depth signal and the data frequencies to produce an output. A switchable filter section limits the antenna output in a normal mode to one frequency band that is above a predetermined frequency to pass the depth signal and the data stream at one or more frequencies and for limiting the antenna output in a rebar mode to another frequency band to pass the depth signal at less than the predetermined frequency and the data stream above the predetermined frequency. A processor is configured for switching the switchable filter section between the normal mode and the rebar mode to recover the depth signal and the data stream responsive to selection of the normal mode and the rebar mode.

In another aspect of the disclosure, a system, method and apparatus are described in which a transmitter is configured to move through the ground in a region during an operational procedure while transmitting a depth signal at a selectable depth signal frequency that is settable to any one of a plurality of incrementally spaced apart frequencies in a depth signal frequency range below 1 KHz to provide at least some immunity to passive interference and which is also subject to low frequency electromagnetic noise below 1 KHz or that can vary within the region and to transmit a data signal that at least characterizes an orientation of the transmitter in a data frequency range above 1 KHz. A portable device is configured to scan the plurality of incrementally spaced apart frequencies below 1 KHz to measure the electromagnetic noise at each one of the plurality of incrementally spaced apart frequencies to identify at least one low noise frequency for setting the depth frequency in the transmitter to dynamically position the depth signal frequency in relation to the low frequency noise.

BRIEF DESCRIPTIONS OF THE DRAWINGS

Example embodiments are illustrated in referenced figures of the drawings. It is intended that the embodiments and figures disclosed herein are to be illustrative rather than limiting.

FIG. 9b is a plot that diagrammatically illustrates an embodiment of a normalized filter response of a normal mode filter shown in FIG. 9a.

FIG. 9c is a plot that diagrammatically illustrates an embodiment of a normalized response of a rebar mode filter shown in FIG. 9a.

FIG. 10a is an expanded view of frequency sub-band 6 from FIG. 6a.

DETAILED DESCRIPTION

Figure 1:
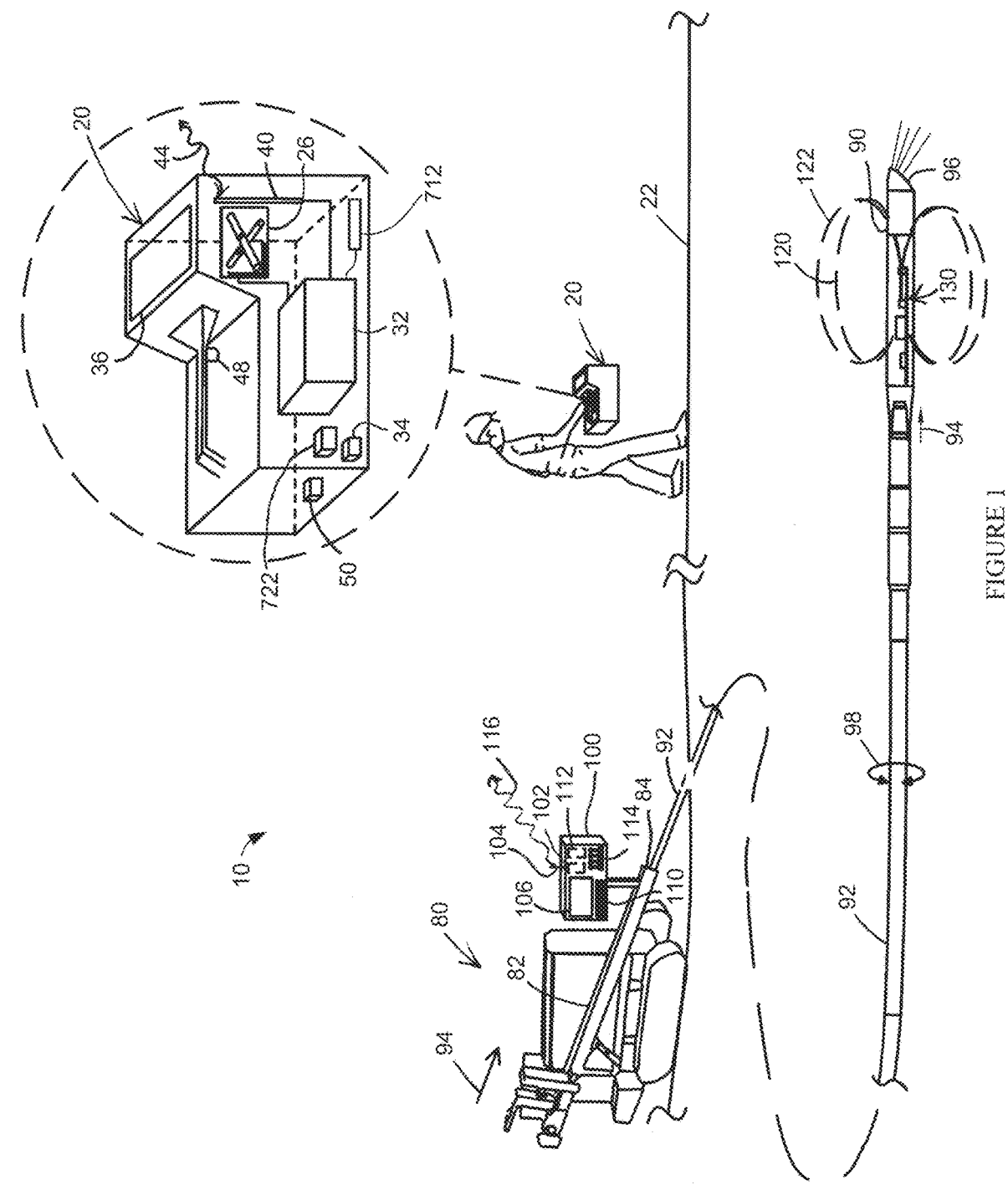
FIG. 1 is a diagrammatic view of an embodiment of a system for performing an inground operation in accordance with the present disclosure.

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents. It is noted that the drawings are not to scale and are diagrammatic in nature in a way that is thought to best illustrate features of interest. Descriptive terminology may be adopted for purposes of enhancing the reader's understanding, with respect to the various views provided in the figures, and is in no way intended as being limiting.

By way of introduction, Applicants recognize that, while the prior art has attempted to address the problem of passive interference, for example, caused by the presence of rebar, there remains a need for improvement. Applicants submit that passive interference is a persistent problem that represents one of the most challenging concerns that must be overcome on a jobsite in addition to active interference and, until now, this concern has been unresolved to an acceptable degree by the prior art. Applicants now recognize that the reception of an electromagnetic signal is impacted in one way by passive interference for purposes of determining the depth and location of an inground transmitter and impacted in an entirely different way for purposes of recovering a data stream from an electromagnetic signal that characterizes the orientation and other parameters of an inground transmitter. In this regard, determination of the depth and location of the inground transmitter depends upon the shape and signal strength of the electromagnetic field or flux lines of the electromagnetic signal. The field shape of the electromagnetic signal, however, can be distorted by electrical conductors such as, for example, rebar. This distortion can lead to inaccurate depth and location determination. While the distortion can be reduced by decreasing the frequency of the electromagnetic signal, Applicants recognize that the subject distortion bears little, if any, impact on recovering a data stream or data from an electromagnetic signal that characterizes the orientation of the inground transmitter. That is, data can be decoded from a higher frequency electromagnetic signal, irrespective of field distortion, so long as there is sufficient signal strength for purposes of decoding the received signal. Accordingly, Applicants bring to light the separation of what is considered to be an ultralow depth frequency (e.g., at or below 1 KHz or at or below 1.5 KHz) from one or more data signal frequencies such that the depth frequency exhibits higher immunity from passive interference than a higher data signal frequency above any suitable frequency threshold or limit such as, for example, above 1 KHz or 1.5 KHz, which is more impacted by passive interference than the depth signal frequency in terms of field shape, but nevertheless serves to transmit the data stream despite the additional field distortion in the presence of passive interference. At the same time, such low frequency ranges can tend to be ultra noisy. Applicants resolve this concern, based on a further capability to scan the electromagnetic noise in an appropriate low frequency band such as, for example, from a powerline frequency up to suitable upper frequency limit 1 KHz or 1.5 KHz to determine one or more frequencies in the low frequency band that are at free of or at least relatively low in noise, thereby avoiding the presence of excess noise. Applicants believe that the combined features disclosed above and elsewhere herein have not been seen in the prior art at least for the reason that a primary perception in the prior art was that ultralow frequencies (e.g., at or below 1 KHz or 1.5 KHz) are not practical depth frequencies based on the presence of high active interference at such low frequencies. That is, one of ordinary skill in the art would dismiss the idea of using such a low frequency out-of-hand as likely rendering a system as incapable of receiving the depth signal, and potentially even the data signal, due to the need to admit additional low frequency active interference in order to receive the low frequency depth signal. It is submitted that the present application sweeps aside the concerns of the prior art. A bit, for purposes of the present application, is a binary data value having two states characterized such as 1/0, +/−, and the like. A symbol, for purposes of the present disclosure, is a data value that represents one or more bits. A multi-bit symbol represents two or more bits. A symbol can characterize any suitable type of information such as, for example, pitch data, roll data, temperature data, battery data and synchronization data, without limitation. Different multi-bit symbols represent different, multi-bit data values. For example, 16 different symbols can represent a four bit data value. Each multi-bit symbol, for purposes of the present disclosure, is represented by a distinct frequency that is different from the frequency that is associated with any other multi-bit symbol. A symbol stream is made up of a serial transmission of multi-bit symbols such that the symbol stream is decodable into a corresponding digital data stream, which can be binary. The symbol stream can be transmitted subject to a packet structure such that the particular position of a given symbol within the packet structure defines a data type that is associated with that symbol.

Turning now to the drawings, wherein like items may be indicated by like reference numbers throughout the various figures, attention is immediately directed to FIG. 1, which illustrates one embodiment of a system for performing an inground operation, generally indicated by the reference number 10. The system includes a portable device 20 that is shown being held by an operator above a surface 22 of the ground as well as in a further enlarged inset view. It is noted that only limited inter-component cabling is shown within device 20 in order to maintain illustrative clarity, but all necessary cabling is understood to be present and may readily be implemented by one having ordinary skill in the art in view of this overall disclosure. Device 20 includes a three-axis antenna cluster 26 measuring three orthogonally arranged components of magnetic flux. One embodiment of a useful antenna cluster contemplated for use herein is disclosed by U.S. Pat. No. 6,005,532 which is commonly owned with the present application and is incorporated herein by reference. Details with respect to the embodiment of the antenna utilized herein will be provided at an appropriate point hereinafter. Antenna cluster 26 is electrically connected to an electronics section 32. A tilt sensor arrangement 34 can be provided for measuring gravitational angles from which the components of flux in a level coordinate system may be determined. An appropriate tilt sensor includes, by way of non-limiting example, a triaxial accelerometer.

Device 20 can further include a graphics display 36 and a telemetry antenna 40. The latter can transmit or receive a telemetry signal 44 for data communication with the drill rig. It should be appreciated that graphics display 36 can be a touch screen in order to facilitate operator selection of various buttons that are defined on the screen and/or scrolling can be facilitated between various buttons that are defined on the screen to provide for operator selection. Such a touch screen can be used alone or in combination with an input device 48 such as, for example, a trigger button. The latter can be used without the need for a touch screen. Moreover, many variations of the input device may be employed and can use scroll wheels and other suitable forms of selection device either currently available or yet to be developed. The electronics section can include components such as, for example, one or more processors, memory of any appropriate type, antenna drivers and analog to digital converters. As is well known in the art, the latter should be capable of detecting a frequency that is at least twice the frequency of the highest frequency of interest. Other components may be added as desired such as, for example, a magnetometer 50 to aid in position determination relative to the drill direction and ultrasonic transducers for measuring the height of the device above the surface of the ground.

Still referring to FIG. 1, system 10 further includes drill rig 80 having a carriage 82 received for movement along the length of an opposing pair of rails 84. An inground tool 90 is attached at an opposing end of a drill string 92. By way of non-limiting example, a boring tool is shown as the inground tool and is used as a framework for the present descriptions, however, it is to be understood that any suitable inground device may be used such as, for example, a reaming tool for use during a pullback operation or a mapping tool. Generally, drill string 92 is made up of a plurality of removably attachable drill pipe sections such that the drill rig can force the drill string into the ground using movement in the direction of an arrow 94 and retract the drill string responsive to an opposite movement. The drill pipe sections can define a through passage for purposes of carrying a drilling mud or fluid that is emitted from the boring tool under pressure to assist in cutting through the ground as well as cooling the drill head. Generally, the drilling mud also serves to suspend and carry out cuttings to the surface along the exterior length of the drill string. Steering can be accomplished in a well-known manner by orienting an asymmetric face 96 of the boring tool for deflection in a desired direction in the ground responsive to forward, push movement which can be referred to as a "push mode." Rotation or spinning 98 of the drill string by the drill rig will generally result in forward or straight advance of the boring tool which can be referred to as a "spin" or "advance" mode.

The drilling operation can be controlled by an operator (not shown) at a control console 100 which itself includes a telemetry transceiver 102 connected with a telemetry antenna 104, a display screen 106, an input device such as a keyboard 110, a processing arrangement 112 which can include suitable interfaces and memory as well as one or more processors. A plurality of control levers 114, for example, control movement of carriage 82. Telemetry transceiver 104 can transmit or receive a telemetry signal 116 to facilitate bidirectional communication with portable device 20. In an embodiment, screen 106 can be a touch screen such that keyboard 110 may be optional.

In an embodiment, device 20 is configured for receiving an electromagnetic depth signal 120 and an electromagnetic data signal 122 that are transmitted from a transmitter 130 that is supported within the boring tool or other inground tool. These signals may be referred to collectively herein as the transmitter signals. The transmitter signals can be dipole signals. It should be appreciated that the portable device can be operated in either a walkover locating mode, as illustrated by FIG. 1, or in a homing mode having the portable device placed on the ground, for example, as illustrated by commonly owned U.S. Pat. No. 9,540,879 which is incorporated by reference in its entirety. While the present disclosure illustrates a dipole locating field transmitted from the boring tool and rotated about the axis of symmetry of the field, the present disclosure is not intended as being limiting in that regard.

Information carried by the data signal can include, but is not limited to position orientation parameters based on pitch and roll orientation sensor readings, temperature values, pressure values, battery status, tension readings in the context of a pullback operation, and the like. Device 20 receives the transmitter signals using antenna array 26 and processes received data signal 122 to recover the data, as will be further described.

Figure 2:
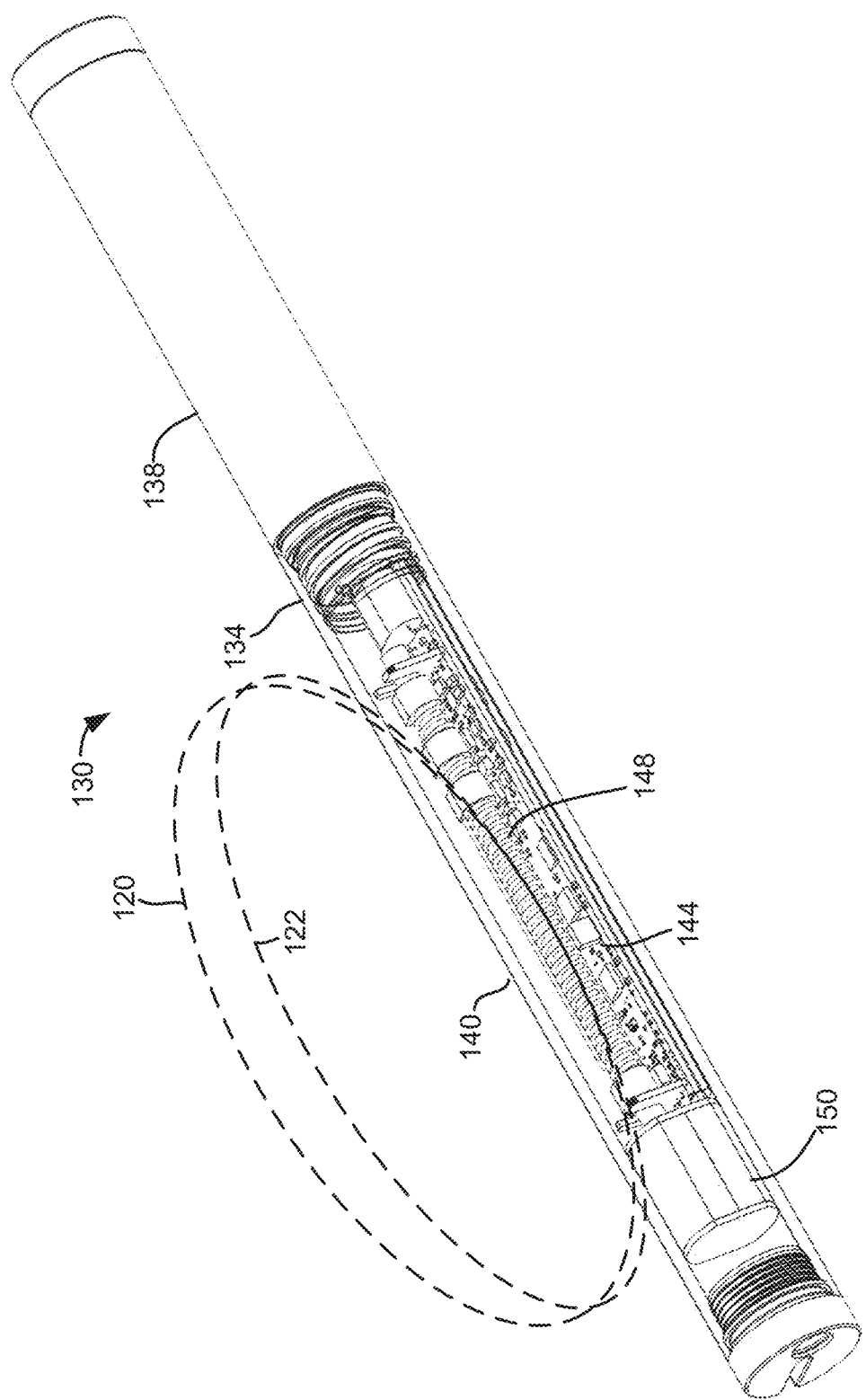
FIG. 2 is a diagrammatic, partially cutaway view, in perspective, which illustrates an embodiment of a transmitter produced in accordance with the present disclosure.

FIG. 2 is a diagrammatic, partially cutaway view, in perspective, which illustrates an embodiment of transmitter 130. The latter includes a main housing 134 that can be at least generally cylindrical in configuration. A battery compartment 138 can be formed at one end of the housing with an opposing end 140 supporting a main printed circuit board (PCB) 144 which itself can support an antenna 148 that emits the transmitter signals. An accelerometer module 150 can be positioned adjacent to one end of PCB 144. Other sensors and components can be located on the main printed circuit board, as will be further described.

Figure 3:
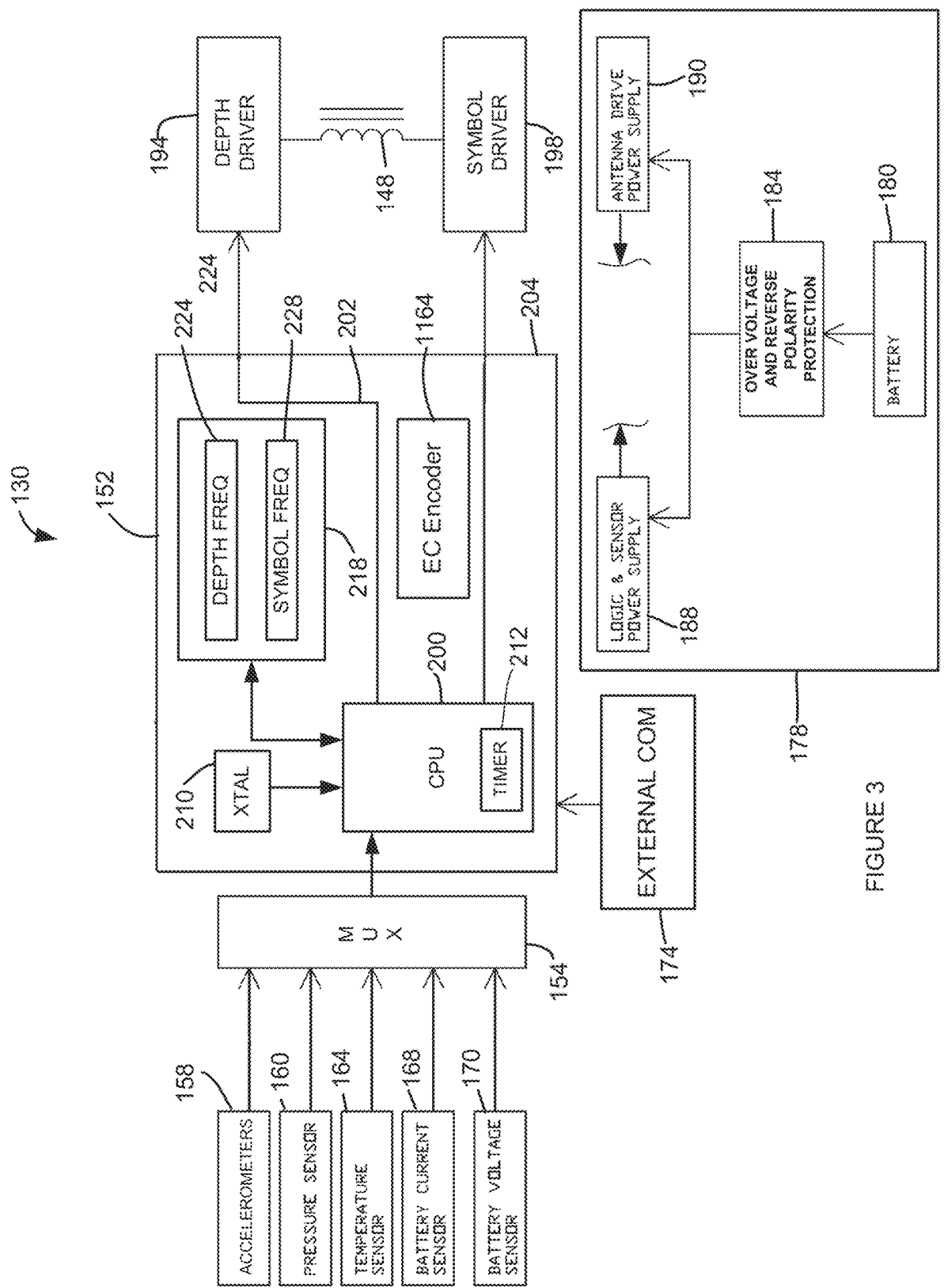
FIG. 3 is a block diagram illustrating additional details of the transmitter with respect to the embodiment of FIG. 2.

Attention is now directed to the block diagram of FIG. 3 in conjunction with FIG. 2 for purposes of describing additional details with respect to an embodiment of transmitter 130. The transmitter includes a processing section 152 that receives sensor information via a multiplexer 154. The multiplexer can be interfaced with any number of sensors forming a sensor suite. In the present example, the sensors include accelerometers 158 that are supported in accelerometer module 150 of FIG. 2, a pressure sensor 160 which can be used to sense the annular pressure within the borehole around the transmitter, a temperature sensor 164, a battery current sensor 168 and a battery voltage sensor 170. External communication for the transmitter can be provided, in some embodiments, by an external communication connection 174. Such communication is not required to be transmitted through the ground but rather can be performed while the transmitter is above ground, for example, in a position adjacent to device 20. The external communication can be implemented in any suitable manner including but not limited to IrDA, NFC, Wi-Fi, Zigbee or Bluetooth. A power supply section 178 can comprise a battery 180 that provides power via an overvoltage and reverse polarity detector 184. The latter provides electrical power to a logic and sensor power supply 188 and to an antenna drive power supply 190. The logic and sensor power supply provides power to the sensor suite as well as to processing section 152. The antenna drive power supply feeds electrical power to a depth antenna driver 194 and a data antenna driver 198 which electrically drive opposing ends of an antenna coil forming part of antenna 148. Drivers 194 and 198, in an embodiment, can be half bridge drivers. The antenna drivers receive input signals from a processor 200 that forms part of the processing section. The processing section further includes an oscillator 210 such as, for example, a crystal oscillator. The oscillator can be selected to provide a relatively high degree of temperature and overall stability. Processor (CPU) 200 includes a timer section 212 that can serve to generate a reference signal having a stability that reflects the stability of oscillator 210. The output frequency of the timer is selectable based on a reload timer value that can be specified by the user. The processor is in data communication with a memory 218 which can include any suitable information including, but not limited to depth frequency information 224 and symbol frequency information 228, each of which will be described at an appropriate point hereinafter.

Figure 4:
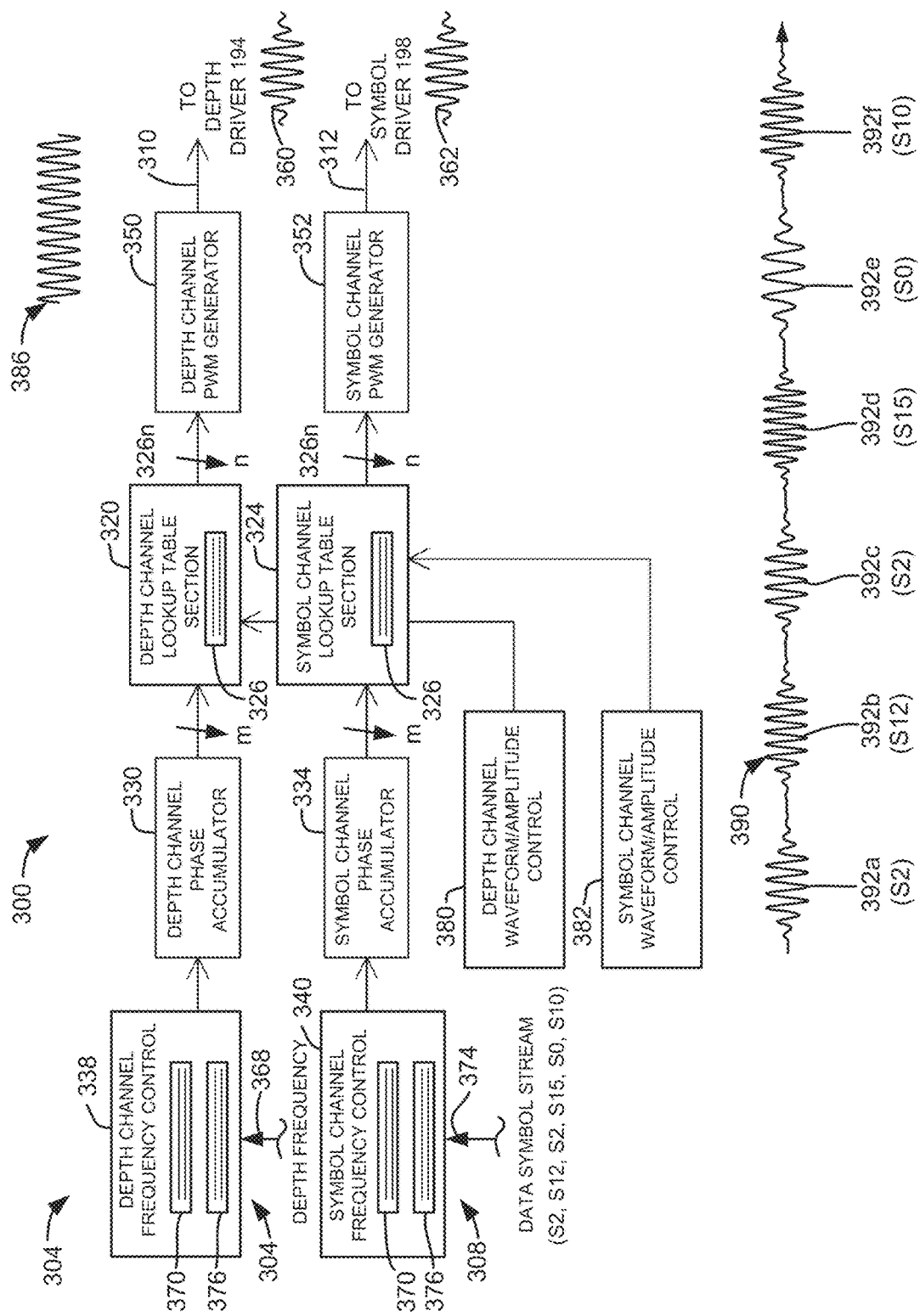
FIG. 4 is a block diagram illustrating details of an embodiment of a frequency synthesizer which forms part of the embodiment of the transmitter of FIGS. 2 and 3.

Turning to FIG. 4, an embodiment of a frequency synthesizer is generally indicated by the reference number 300 and is implemented as part of processing section 152 of FIG. 3. It should be appreciated that the frequency synthesizer can be implemented in hardware, software or any suitable combination thereof. The frequency synthesizer can be any suitable embodiment either currently available or yet to be developed. The embodiment of FIG. 4 is a two channel direct digital synthesizer (DDS) having a depth channel 304 and a symbol channel 308. The depth channel provides an output signal 310 to depth driver 194 of FIG. 3 for producing depth signal 120 while the symbol channel provides an output signal 312 to data driver 198 of FIG. 3 for producing data signal 122 (FIGS. 1 and 2). A depth channel waveform lookup table section 320 and a symbol channel waveform lookup table section 324 each includes at least one waveform or phase lookup table that characterizes one period of a selected waveform such as, for example, a sinusoid. In another embodiment, each of the depth channel lookup table section and the symbol channel lookup table section can include a plurality of waveform or phase lookup tables. In the present example, there is one waveform lookup table diagrammatically shown and indicated by the reference number 326 in each of the depth channel and symbol channel lookup table sections. It should be appreciated that any desired waveform or waveforms can be characterized by the lookup table(s). Further, there is no requirement for the depth channel lookup table(s) and the symbol channel lookup table(s) to characterize the same waveform(s). In some embodiments of a frequency synthesizer, there is no requirement for a lookup table. For example, a suitable mathematical expression can be used.

Figure 5A:
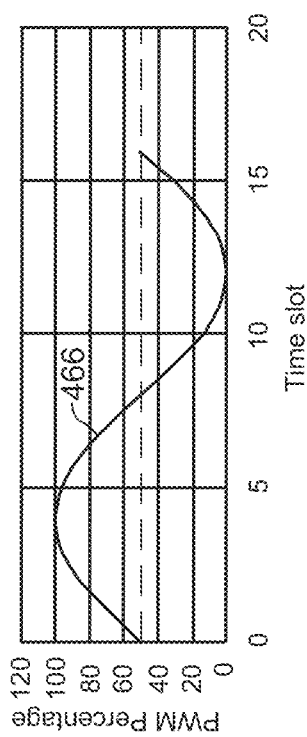
FIG. 5a is a diagrammatic representation of a lookup table that can be used for the depth and symbol frequency lookup tables shown in FIG. 4.

FIG. 5a is a graphical illustration of lookup table 326 which can include a large number of samples of the magnitude of the characterized waveform based, for example, on the amount of memory that is available and the desired resolution. Given that the depth channel and the symbol channel use the same lookup table in the present embodiment, it should be appreciated that it is only necessary to store a single copy for access by both channels. In the present embodiment, lookup table 326 represents one period of a sinusoidal waveform. The vertical axis represents Pulse Width Modulation (PWM) percentage with the positive waveform peak at 100 percent and the negative waveform peak at 0 percent for reasons yet to be described. The horizontal axis of the plot represents time slots such that a given time slot has an associated amplitude. The time slot values can be referred to as samples that are selectively addressable by a depth channel phase accumulator 330 and a symbol channel phase accumulator 334, respectively, using an m-wide addressing arrangement. It is noted that a very large number of samples can be associated with the lookup table. Each phase accumulator is configured to provide an output count to the lookup table section based on an input increment or offset size that is provided by a depth channel frequency control 338 and a symbol channel frequency control 340, respectively. Each phase accumulator generates what can be described as a quantized sawtooth waveform output that changes from one level or count to the next by a respective one of the input increment sizes. In response to each respective phase accumulator input count, for either the depth channel or the symbol channel, lookup table 326 sequentially generates digital output magnitudes that are received by a depth channel pulse width modulator (PWM) generator 350 and a symbol channel pulse width modulator (PWM) generator 352, respectively, on an n-wide address arrangement. Based on the magnitude value received by each PWM generator, a pulse width modulator generates an output pulse train having an at least generally constant output magnitude but with a pulse width that increases in proportion to the output magnitude value from the lookup table. Filtering, via the inductive properties of antenna 148, smooths the waveform to approximate a desired output waveform such as, for example, a sinusoidal waveform.

Referring again to FIG. 4, each of a depth channel output waveform 360 and a symbol channel output waveform 362 can be generated, for example, across a frequency range approaching 0 Hz to 45 KHz with a high degree of accuracy. It should be appreciated that any suitable frequency range can be utilized and the range of 0 to 45 KHz has been described by way of example and is not intended to be limiting. In the present embodiment, the accuracy can be at least approximately +/−0.1 Hz or less at a resolution of at least approximately 5 Hz. It is noted that the specified accuracy, in the context of the present embodiment, is given for at least approximately 45 KHz which represents a lower limit on accuracy across the frequency range. As compared to prior art approaches, it should be appreciated that the present disclosure provides for higher precision, greater consistency and remarkable flexibility with respect to frequency placement across the entire transmission bandwidth. Output frequencies 360 and 362 are established based on the input increment size provided to depth channel phase accumulator 330 via depth channel frequency control 338 and symbol channel phase accumulator 334 via symbol channel frequency control 340. Depth channel frequency control 338 receives a depth frequency input 368 that specifies the depth frequency. The depth channel frequency control can convert a specified depth frequency to an increment size for depth channel phase accumulator 330 in any suitable manner. In an embodiment, the depth channel frequency control can include an increment lookup table 370 that indexes depth frequency against the increment size. In another embodiment, a formula can be used to determine the increment size, as follows:

$$\text{increment size} = \frac{(\text{desired frequency}) \times (\text{phase accumulator size})}{(\text{phase accumulator update rate})} \quad (\text{EQN 1})$$

Where the phase accumulator size is chosen to provide the minimum required frequency resolution and the phase accumulator update rate is established by timer 212 (FIG. 3). Similarly, the symbol channel frequency control can convert a specified symbol frequency received on a data symbol stream input 374 to an increment size for symbol channel phase accumulator 334 in any suitable manner such as, for example, by using increment lookup table 370 or a formula. The origin of the data symbol stream for data symbol stream input 374 will be described at an appropriate point hereinafter. It is noted that there is no requirement for the depth and symbol channel frequency controllers to use an identical increment size lookup table. Table 1 below illustrates a portion of an embodiment of increment lookup table 370.

TABLE 1

Desired Output Frequency vs. Phase Accumulator Size Increment

| Desired Output Frequency (Hz) | Phase Accumulator Increment (counts) |
| --- | --- |
| 5 | 1 |
| 50 | 10 |
| 500 | 100 |
| 32770 | 6554 |
| 45000 | 9000 |

Based on Table 1, it should be appreciated that a high degree of resolution is provided in terms of the frequency that is selectable for each of depth output frequency 360 and symbol output frequency 362. In the present embodiment, a resolution of 5 Hz can be provided across the entire frequency range extending from worldwide AC powerline frequencies to 45 KHz. Of course, other embodiments can utilize a like or different resolution to even higher frequencies. Other resolutions can be used, some of which are larger and some of which are even more fine, however, Applicants recognize that 5 Hz represents a relatively small common multiple of 50 Hz and 60 Hz which are the predominant powerline frequencies around the world. Further discussions with respect to powerline frequencies will be presented below.

With continuing reference to FIG. 4, it should be appreciated that depth output frequency 360 and symbol output frequency 362 are illustrated as frequency tones that are of a limited or fixed duration, an at least essentially fixed frequency and can include a variable magnitude. In this regard, primary amplitude control can be provided based on a multiplier that can be specified by a multiplier table 376 that is accessible by both depth channel frequency control 338 and symbol channel frequency control 340. The multiplier is specified in the range from 0 to 1.0. In order to produce a desired transmission power for a given frequency, samples obtained from lookup table 326 are multiplied by the multiplier. Thus, a multiplier of 1.0 produces maximum or 100 percent amplitude whereas a multiplier of zero produces an output of zero. As will be further described, the multiplier table can be used to compensate for changes in coupling between the antenna and drive circuits as well as changes in antenna impedance responsive to varying frequency. Again, only one copy of the multiplier table need be stored if the same table is used by both channels. Further, magnitude/amplitude shaping can be accomplished using a depth channel waveform/amplitude control 380 for the depth channel which may be referred to as a depth channel shaper and a symbol channel waveform/amplitude control 382 which may be referred to as a symbol channel shaper. Another example output of depth channel PWM generator 350 is a continuous depth signal 386 which is of at least essentially a continuous magnitude. In this instance, depth channel shaper may not be needed, although it should be understood that its operation reflects the operation of the symbol channel shaper, as described herein. It should be appreciated that the depth of the transmitter, based on depth signal 386, can be determined based on the well-known dipole equations, as described for example, in U.S. Pat. No. 5,633,589 which is incorporated herein by reference. Another example output 390 of symbol channel PWM generator 352 illustrates a series of output symbols indicated as 392a-392f which can vary in frequency from one symbol to the next. As will be further described, output 390 can comprise a symbol stream. In the present embodiment, there is no gap or zero magnitude space present or inserted between adjacent symbols by phase accumulator 334. Thus, the frequency can change abruptly from one symbol to the next in a way that can introduce noise responsive to such abrupt frequency transitions. It should be appreciated that symbols 392a-392f are shaped in a way that avoids abrupt frequency transitions by beginning and ending at a value of approximately zero magnitude. Such shaping can be accomplished through the application of a suitable window or tapering function by symbol channel shaper 382 such as, for example, a Hamming window, Hann window, Welch window or a triangular window, among others. What is common to all of the subject window functions resides in a zero magnitude of the waveform for any point that is outside of a window interval such that each symbol starts and ends with a zero magnitude waveform.

Figure 5B:
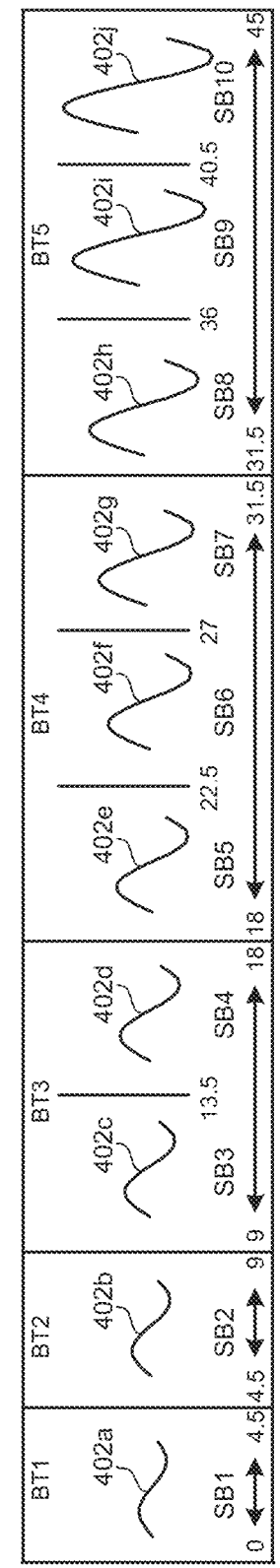
FIG. 5b is a diagrammatic representation of embodiments of antenna drive waveforms based on increasing frequency.

Attention is now directed to FIG. 5b and Table 2 in conjunction with FIGS. 2, 4 and 5a. Although not a requirement, embodiments of transmitter 130 can be configured to transmit depth signal 120 and data signal 122 using a series of transmitter bands, generally indicated by the reference number 400 that extend from approximately 0 to 45 KHz, as shown in FIG. 5b. It should be understood that other embodiments can use different transmitter bands and sub-bands with the present embodiment serving by way of a non-limiting example. While the value of zero is listed as a lower limit, it should be understood that the actual lower limit can be represented by worldwide predominant power line frequencies or some higher value. The transmitter bands are indicated as BT1-BT5 and are also set forth in Table 2. While the descriptive framework employed by FIG. 5b and Table 2 uses transmitter bands that include frequency sub-bands, it should be appreciated that this band/sub-band nomenclature can be varied in any suitable manner, for example, so long as there is an appropriate correspondence with the final column of Table 2 which comprises multiplier table 376. It is noted that the value of the multiplier from one sub-band to the next in multiplier table 376 progressively increases in the illustrated embodiment, which is also reflected by the progressively increasing magnitudes of sub-band waveforms 402a-402j in FIG. 5b. In another embodiment, each sub-band waveform 402a-402j can be a separate lookup table to make up a set of lookup tables, instead of using a multiplier table with a single lookup table. In another embodiment, there is no need to define frequency bands or sub-bands since the multiplier can be specified, for example, as a function. As noted above, there is no requirement to use a lookup table. For example, in an embodiment, an expression can be used in the form of a function that is linear and can give an essentially continuous variation in the multiplier value at the transmit frequency resolution of the transmitter. Other functions can be developed, for instance, using an appropriate curve fitting approach such as, for example, least squares.

TABLE 2

Transmitter Bands and Sub-Bands

| Transmitter Band | Band Frequency Range | Sub-Band No. | Sub-Band Frequency Range | Multiplier Table 376 |
|---|---|---|---|---|
| BT1 | 0-4.5 KHz | SB1 | 0 to 4.5 KHz | 0.34 |
| BT2 | 4.5 KHz-9 KHz | SB2 | 4.5 KHz to 9 KHz | 0.45 |
| BT3 | 9 KHz-18 KHz | SB3 | 9 KHz to 13.5 KHz | 0.55 |
|  |  | SB4 | 13.5 KHz to 18 KHz | 0.63 |
| BT4 | 18 KHz-31.5 KHz | SB5 | 18 KHz to 22.5 KHz | 0.70 |
|  |  | SB6 | 22.5 KHz to 27 KHz | 0.75 |
|  |  | SB7 | 27 KHz to 31.5 KHz | 0.82 |
| BT5 | 31.5 KHz-45 KHz | SB8 | 31.5 KHz to 36 KHz | 0.86 |
|  |  | SB9 | 36 KHz to 40.5 KHz | 0.92 |
|  |  | SB10 | 40.5 KHz to 45 KHz | 1.00 |

Still referring to FIG. 5b, the frequency range from 0 to 45 KHz, in accordance with the present embodiment, is further divided into 10 sub-bands SB1-SB10, each of which is 4.5 KHz in width. Each band above BT1 and sub-band 1 can be considered as including its lower frequency limit. The use of the transmitter bands, although not required, allows for managing transmission efficiency as well as transmission power. While transmitter bands BT1 and BT2 each include a single sub-band, it is noted that transmitter band BT3 includes two sub-bands, SB3 and SB4, and transmitter bands BT4 and BT5 each include three sub-bands: SB5-SB7 and SB8-SB10, respectively. An embodiment of a transmitter according to the present disclosure can be configured to transmit depth signal 120 and data signal 122 in a single sub-band. In another embodiment, a transmitter can be configured to transmit depth signal 120 in band that is different from the band that is used for data signal 122. In this regard, it should be appreciated that the use of a separate synthesizer channel (FIG. 4) for the depth channel provides for a great degree of flexibility with regard to the frequency of the depth signal in relation to the data signal. In a wideband transmitter, as further described below, the transmitter can transmit on two or more bands such that the bands can even be spaced apart by other bands.

In some embodiments, transmitter 130 can be configured to cooperate with antenna 148 such that the transmitter transmits over a wide frequency range or band extending from a lowermost frequency to approximately 45 KHz or higher. In this way, this wide frequency band can be covered by a single wideband transmitter, using a single antenna, while maintaining suitable efficiency with respect to power consumption across the entire wide frequency range. In order to transmit across an entire frequency range from a lowermost frequency to approximately 45 kHz, by way of non-limiting example, embodiments of multiplier table 376 can be configured to include any suitable number of values. Depth channel phase accumulator 330 and symbol channel phase accumulator 334 can be configured to utilize the appropriate entry in multiplier table 376 based on the frequency to be generated. In this way, an at least generally constant power consumption can be maintained over the entire wide transmission bandwidth, irrespective of transmit frequency. In the prior art, given a constant drive voltage and waveform, the transmitter would otherwise draw increasingly more power as the frequency is reduced. The antenna, in the embodiments presented herein, is not required to be driven at a resonant frequency. The resonant frequency that is presented by the inductance of antenna 148, in combination with any parasitic capacitances, is generally far higher than a highest frequency of the transmission range such as, for example, 45 kHz. For instance, the resonant frequency can be in the megahertz range.

In one embodiment of a wideband transmitter, the transmitted frequency set can range from SB3 through SB10, corresponding to a wideband frequency range of 9 KHz to 45 KHz. There is no need for frequency confinement in any of these sub-bands (see, for example, Table 2) in the context of a wideband transmitter.

Based on the foregoing, the present disclosure can provide a wideband transmitter having a single antenna that is driven across a wide frequency band in a way that can maintain constant or controlled power consumption, at least to an approximation, when the power consumption would otherwise exhibit large variations across that same frequency band by using a single drive signal waveform or lookup table in conjunction with a multiplier value. Variation in the power consumption across the wide frequency band can be limited to acceptably low levels across the range of 9 KHz to 45 kHz. In this way, Applicants are able to provide a wideband transmitter that operates across a wide frequency range with power consumption regulation and control that is submitted to have been unseen heretofore. In the past, performing inground operations at different frequencies for depth and locating data often required the purchase of a transmitter that was dedicated to each frequency of interest. The recognitions that have been brought to light herein can result in significant cost savings since a single wideband transmitter can replace a plurality of prior art transmitters. In this regard, the teachings herein are equally applicable with respect to a transmitter that transmits a depth frequency or tone at one discrete frequency and transmits a data signal at a different frequency that is modulated in any suitable manner such as, for example, using BPSK, QPSK or Manchester encoding.

As discussed above, Applicants recognize that there are benefits associated with transmitting the depth frequency or tone at a relatively low or ultralow frequency such as, for example, 1 kHz or lower and transmitting a signal frequency at one or more higher frequencies such as, for example, in a range extending upward from 1 KHz or higher, such as, for example, higher than 4.5 KHz. In an embodiment, transmitter 130 includes what may be referred to as a "rebar" or passive interference mode in order to lessen the effects of passive interference while, at the same time, preserving data throughput at the data frequencies. In this regard, low depth tone frequencies avoid sources of passive interference such as rebar at the risk of exposure to additional low frequency active interference in the absence of the provisions disclosed herein, while higher data frequencies are associated with higher rates of data throughput based on the Nyquist rate. Because the presence, for example, of rebar can distort, weaken and misshape the electromagnetic locating field of the transmitter, these effects can cause difficulty in accurately locating the position of the inground transmitter, which relies on the shape of the locating field, as well as presenting incorrect depth readings which rely on the signal strength of the locating signal. For example, the point at the surface of the ground that is indicated to be directly above the transmitter can be shifted away from its actual position. As another example, passing under rebar can produce a sudden increase in the displayed depth of the transmitter of an inground tool responsive to signal attenuation caused by the rebar. Using a relatively lower frequency for the depth signal is beneficial in terms of avoiding these effects. Until now, it is submitted that transmitting the depth signal at the low frequencies disclosed herein such as, for example, below 1 KHz, presented technical challenges that were perceived to be insurmountable in the prior art including the aforementioned presumption that ultralow depth frequencies are subject to too much active interference to be practical. The present disclosure is submitted to sweep aside the perceived limitations of the prior art with a heretofore unseen combination of features.

The present disclosure allows for the transmission of a depth tone that is spaced apart from data frequencies by an amount that is submitted to be heretofore unseen, particularly when a single antenna is used to transmit both. For example, the depth tone can be transmitted at 1 kHz or less, as will be described immediately hereinafter.

Figure 5C:
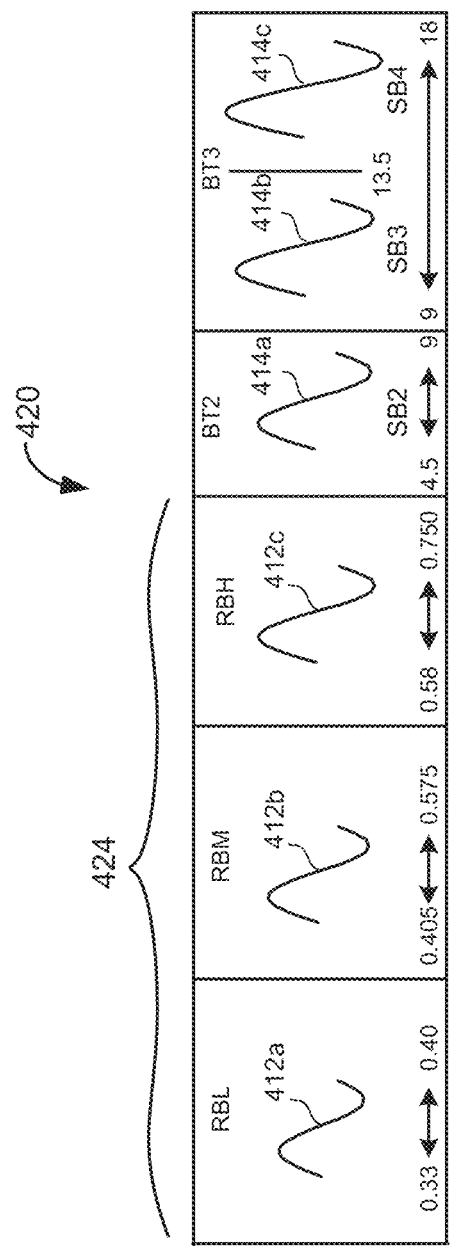
FIG. 5c is a diagrammatic representation of one embodiment of transmitter bands for use in a rebar mode.

Attention is now directed to FIG. 5c which is a diagrammatic illustration of a series of transmitter bands, generally indicated by the reference number 420 for an embodiment of the rebar mode. It is noted that all frequency values are given in KHz in the figure. The present embodiment also includes previously described transmitter bands BT2-BT3 which were set forth in Table 2 and repeated in Table 3. In this embodiment, a set of rebar bands 424 includes rebar low band, RBL, extending from approximately 330 Hz to 400 Hz; a rebar middle band, RBM, extending from approximately 405 Hz to 575 Hz; and a rebar high band, RBH, extending from approximately 580 Hz to 750 Hz. It is noted that the number of rebar bands and their endpoints can be varied in any suitable manner. For example, RBH can include an upper limit of 1 KHz or some other value between 1 KHz and the lower limit of BT2 at 4.5 KHz such as, for example, 1.5 KHz. As another example, RBL can include a lower limit approaching a powerline frequency. As still another example, a super low band can be added below RBL which can have a lower limit approaching a powerline frequency. As yet another example, an additional band can be inserted between RBH and BT2. Again, there is no need to adopt an approach that specifies the multiplier on a band-by-band basis, so long as the multiplier value is specified for any potential transmit frequency that can be selected.

Rebar bands 424 are set forth in Table 3. The final column of Table 3 comprises a multiplier table 410 which is an embodiment used in place of aforedescribed multiplier table 376 of Table 2 when operating in a rebar mode. Multiplier tables can vary in complex ways based on various factors, as demonstrated by multiplier table 410, which was empirically developed. FIG. 5c diagrammatically illustrates the sinusoidal lookup table subject to multiplier table 410 with waveforms 412a-412c corresponding to RBL, RBM and RBH, respectively. Waveforms 414a-414c correspond to SB2-SB4, respectively.

TABLE 3

Rebar Mode

| Transmitter Band | Band Frequency Range | Sub-Band No. | Sub-Band Frequency Range | Multiplier Table 410 |
|---|---|---|---|---|
| RBL | 330 Hz-400 Hz | n/a | n/a | 0.34 |
| RBM | 405 Hz-575 Hz | n/a | n/a | 0.39 |
| RBH | 580 Hz-750 Hz | n/a | n/a | 0.47 |
| BT2 | 4.5 KHz-9 KHz | SB2 | 4.5 KHz-9 KHz | 0.45 |
| BT3 | 9 KHz-18 KHz | SB3 | 9 KHz to 13.5 KHz | 0.55 |
|  |  | SB4 | 13.5 KHz to 18 KHz | 0.63 |

Table 4 illustrates example frequencies selected based on noise scanning for operation of the transmitter in the rebar mode. It is noted that data frequencies S0-S15 were all selected from SB4, although this is not a requirement. In this regard, these frequencies can be selected at least in SB2-SB4 of FIG. 5c. It should be noted that frequencies in SB2-SB4 generally provide good transmission range with relatively high data throughput or bandwidth. In this regard, one of the sub-bands can be selected on the basis of average noise per sub-band seen during a noise scan, either manually, automatically or some combination thereof. At the same time, a depth frequency of 345 Hz provides a remarkable level of immunity to passive interference such as that, for example, resulting from rebar. Considering multiplier table 410 of Table 3, the multiplier can be set to 1.0 for the highest frequencies or sub-band to be transmitted by a given embodiment of the transmitter. The remaining entries in the multiplier table can be set, for example, to provide for a constant power consumption based on power allocated between the depth signal and the data signal frequencies or based on Applicants recognitions that have been brought to light below. In an embodiment, the values for the multiplier table in either the normal or rebar mode can be empirically determined, for example, by adjusting transmit power of the depth signal in relation to the data signal while observing overall power consumption of the transmitter such that a maximum power threshold is not violated. Such an empirical process is likely best performed in a region of low active interference. A particular embodiment can also consider the reception range of the depth signal in relation to that of the data signal, as will be further discussed below.

TABLE 4

EXAMPLE SELECTED FREQUENCIES FOR REBAR MODE

| Designation | Frequency (Hz) |
|---|---|
| Depth Signal | 345 |
| S0 | 14,740 |
| S1 | 14,850 |
| S2 | 15,085 |
| S3 | 15,210 |
| S4 | 16,500 |
| S5 | 16,770 |
| S6 | 16,695 |
| S7 | 17,105 |
| S8 | 17,190 |
| S9 | 17,225 |
| S10 | 17,240 |
| S11 | 17,335 |
| S12 | 17,445 |
| S13 | 17,560 |
| S14 | 17,680 |
| S15 | 17,995 |

For purposes of comparison, Table 5 sets forth frequency selections for the normal mode wherein the depth signal frequency is above 1 KHz.

TABLE 5

EXAMPLE SELECTED FREQUENCIES FOR NORMAL MODE

| Designation | Frequency (Hz) |
|---|---|
| Depth Signal | 40,675 |
| S0 | 40,740 |
| S1 | 40,850 |
| S2 | 41,085 |
| S3 | 41,210 |
| S4 | 41,500 |
| S5 | 41,825 |
| S6 | 42,235 |
| S7 | 42,400 |
| S8 | 42,700 |
| S9 | 42,845 |
| S10 | 43,205 |
| S11 | 43,420 |
| S12 | 43,665 |
| S13 | 43,825 |
| S14 | 44,360 |
| S15 | 44,635 |

The selected frequencies in Table 5 are chosen from sub-band 10. Applicants recognize that the presence of active inference as detected in a noise scan, that forms the basis of these frequency selections, does not bear on the issue of passive interference. In this regard, an attempt to use the depth signal frequency of Table 5 may prove to be unworkable, necessitating a switch to the rebar mode which uses a far lower frequency for the depth signal such as, for example, 345 Hz, as seen in Table 4. In another embodiment, frequency selections for the depth frequency and the data symbols in the normal mode can be confined to the same frequency range as the data symbol selections for the rebar mode (SB-2 through SB-4 in the example of Table 3). It is noted that in such an embodiment, the reception range for the data frequencies at a given transmit power can be at least somewhat improved in the normal mode as compared to the data signal reception range in the rebar mode at least as a result of the admission of relatively less active interference in the normal mode based resulting from front end filtering, as yet to be discussed.

Having described in detail above transmitters and associated components according to the present disclosure, details with respect to transmission of data signal 122 will now be brought to light. In particular, an M(ary) frequency shift keying approach is used such that a plurality of different symbols can be streamed as data signal 122. In the rebar mode, data symbol frequencies can be selected in BT2 and/or BT3 to make up data signal 122 while depth frequency 120 can be selected within the set of rebar bands 424 (FIG. 5c), based on noise scanning as yet to be described. In the normal or rebar mode, the data signal can serve to transmit a multi-bit symbol stream. The ability to transmit a multi-bit symbol stream is facilitated, at least in part, based on the use of synthesizer 300 of FIG. 4. In particular, a multi-bit data symbol stream can be provided at data symbol stream input 374 to symbol channel frequency control 340. In this way, data symbols corresponding to a wide variety of distinct frequencies can be specified as part of the data symbol stream with each different symbol corresponding to a different frequency. In an embodiment, the data symbols of the symbol stream can correspond to 16 symbols (4 bits), although any suitable number of symbols can be used, based on a desired data throughput. FIG. 4 illustrates output 390 based on 16 symbols, S0-S15, with S0 corresponding to a lowest frequency and each successively higher-numbered symbol corresponding to a relatively higher frequency, although this is not required and the mapping or assignment of symbols to frequencies can be performed in any suitable manner. Thus, output 390 corresponds to an example input symbol stream of S2, S12, S2, S15, S0 and S10 at input 374.

Based on the foregoing, Applicants submit that system 10 can provide a level of active noise immunity and passive interference immunity that has heretofore been unseen with respect to performing an inground operation such as, for example, horizontal directional drilling and related pull-back or back-reaming operations. Related considerations and further details will be provided in the context of a discussion of device 20 which receives the depth signal and the data signal and which also can assist in the identification of the depth signal frequency and symbol frequencies to be used by the transmitter. It should be appreciated that the symbol frequency ordering given by Table 4 is not required. In Table 5, the depth signal frequency can be positioned between symbol frequencies. Based on the use of a separate channel for purposes of generating the depth signal (FIG. 4), the depth signal can be positioned in a different sub-band than the symbol frequencies. Further, the symbol frequencies can be reordered or rearranged in any suitable manner. With regard to constraining frequency selection to a single sub-band, it should be understood that an embodiment of a wideband transmitter can be configured to operate in a manner that mimics the operation of a transmitter that is constrained to operate based on sub-bands. For example, the selected frequencies in a wideband transmitter can be limited or constrained to a single sub-band, even though the wideband transmitter is capable of transmission over a wide range of sub-bands.

Figure 6A:
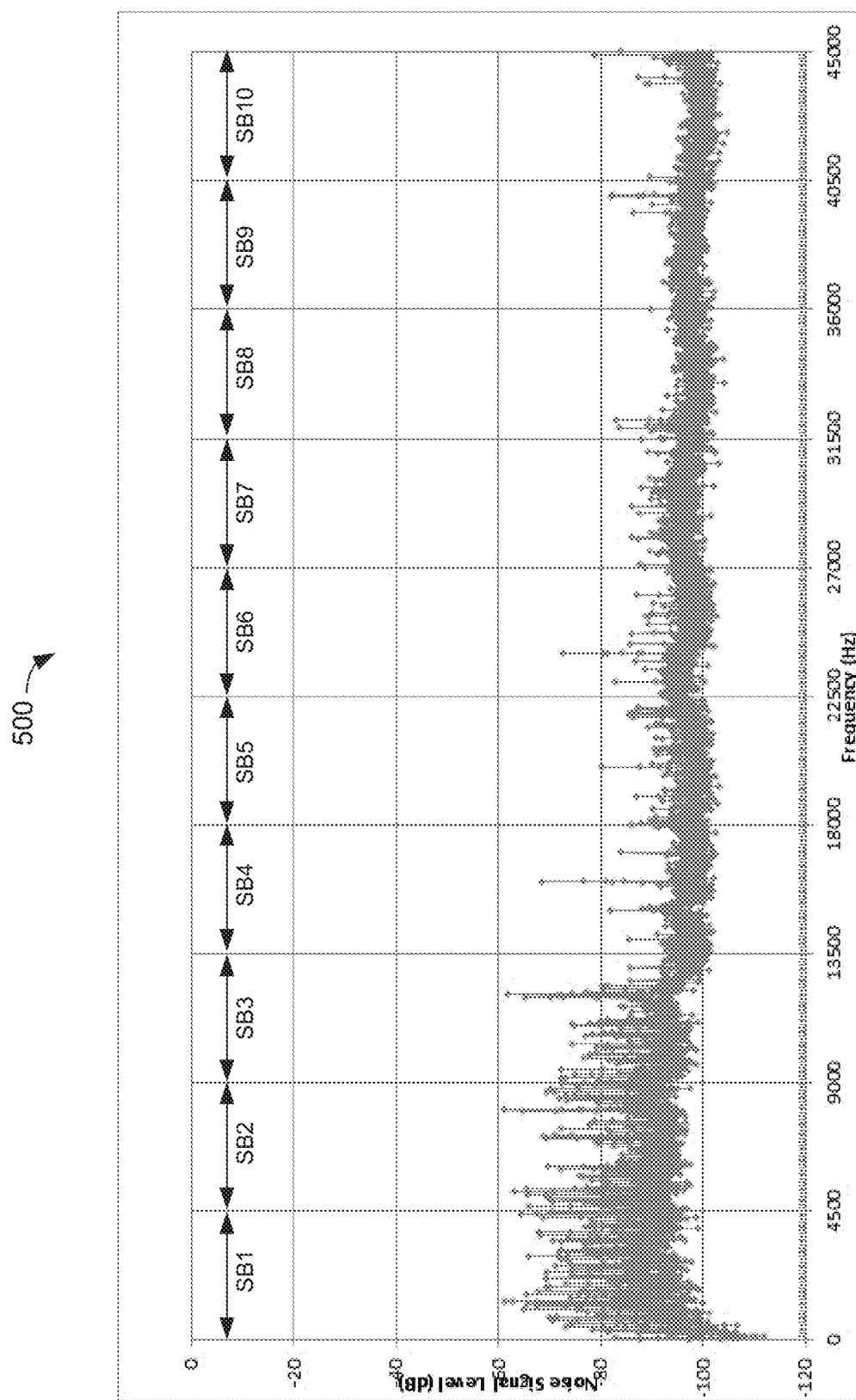
FIG. 6a is a plot of the power spectral density of noise taken at a high resolution, corresponding to an actual physical location at which a 50 Hz powerline frequency is in use.

FIG. 6a is a plot of the power spectral density of noise taken at a high resolution, generally indicated by the reference number 500, corresponding to an actual physical location at which a 50 Hz powerline frequency is in use. The signal level is shown on the vertical axis and the frequency is shown on the horizontal axis. The frequency range of 0 to 45 KHz corresponds to the frequency range that is covered by the range of transmitters described in accordance with the present disclosure. Transmitter sub-bands SB1-SB10 are also indicated. It is of interest to note that sub-band 1 is quite noisy as compared to the noise seen in most of the higher frequency sub-bands. In this regard, it is submitted that one of ordinary skill in the art would have been led to reject the idea of using a depth signal having a frequency below 1 KHz or 1.5 KHz for at least this reason, as will be further discussed. Applicants, however, have brought to light sweeping improvements that provide for precise positioning of the depth signal at a low active noise frequency that can be even lower than 1 KHz.

While the spectral scan of FIG. 6a illustrates spectral information essentially at a single location, it should be appreciated that spectral information can be collected in a cumulative manner. For example, spectral scanning can be performed while an operator walks the planned borepath with device 20 while the device characterizes the noise environment. In this way, the spectral plot of FIG. 6a can be thought of as representing the noise environment along the entire planned borepath with subsequent frequency selections being based on the noise environment as characterized for the entire length of the planned borepath while still utilizing the frequency selection techniques that have been brought to light herein.

Figure 6B:
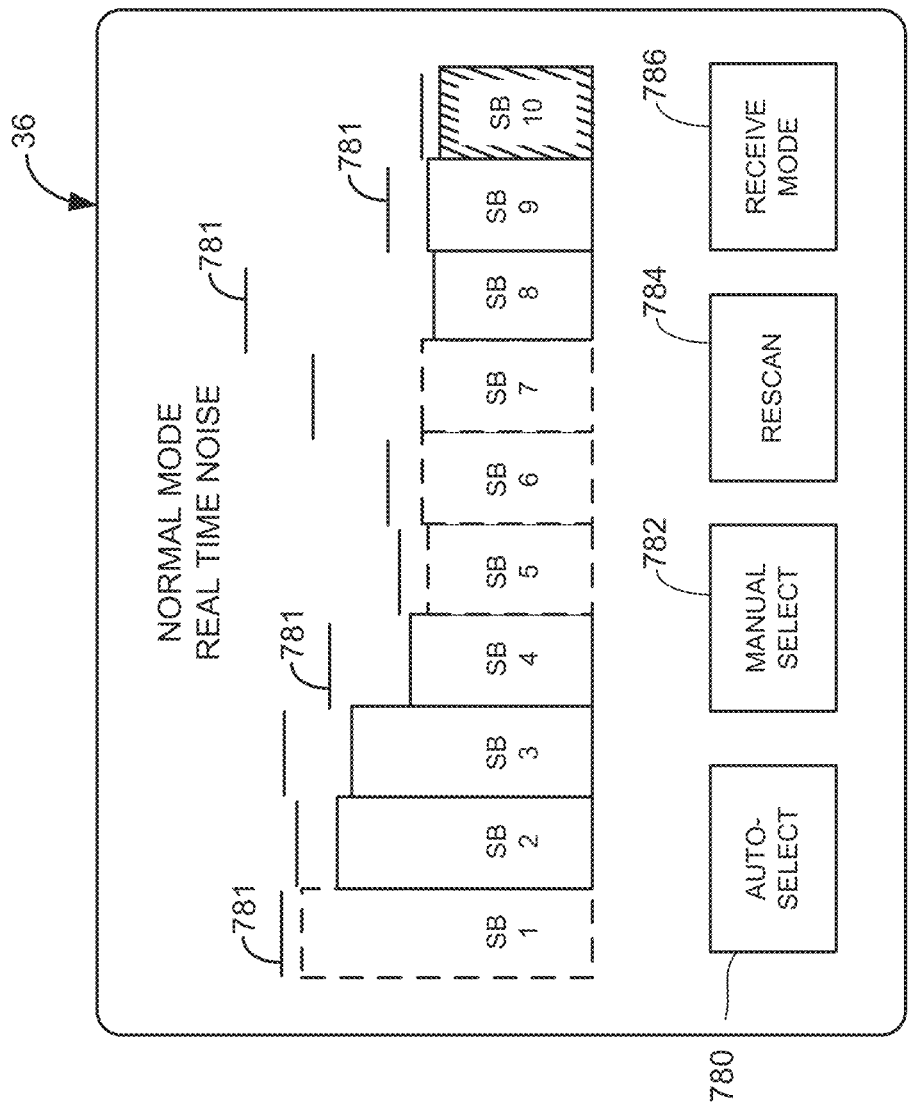
FIG. 6b is a diagrammatic illustration of one embodiment of a screen shot showing a display 36 including a bar graph illustrating the average noise per frequency sub-band for the embodiment of transmitter bands shown in FIG. 5b.

FIG. 6b illustrates one embodiment of a screen shot showing display 36 including a bar graph display illustrating the average noise per sub-band for operation in the normal mode wherein sub-band SB-10 is highlighted, for example, using hatching and/or color or in some other suitable manner to indicate that SB-10 has been automatically selected. In another embodiment, the locator can make an automatic recommendation based on average noise per sub-band in conjunction with other statistical values. Any suitable statistical value(s) can be utilized including, for example, standard deviation, minimum noise and peak noise. In still another embodiment, more than one sub-band can be recommended, in which case the user can select between the recommended sub-bands. Recommending multiple sub-bands can be based on a limited amount of statistical variation between the sub-bands. For example, sub-bands 9 and 10 can both be recommended based on the relatively limited difference between the two sub-bands, as seen in FIG. 6b. As another example, multiple sub-bands can be recommended, for instance, based on the average noise for a first sub-band being lower than the average noise for a second sub-band while the peak noise for the first sub-band is higher than the peak noise for the second sub-band. In an embodiment wherein more than one sub-band is recommended, the system can be configured such that the user can select one of such multiple recommended sub-bands for transmission. In another embodiment, the user can select multiple recommended sub-bands for transmission. In yet another embodiment, one or more of such multiple recommended sub-bands can be automatically selected for transmission. Since the information presented in FIG. 6a is based on a high resolution noise scan using a 5 Hz increment, a significant amount of noise information can be extracted from the data. For example, the standard deviation of the noise values within each sub-band can be determined. The heights of the various bars in FIG. 6b can be weighted by adding or subtracting a value based on one or more other statistics. For example, if the standard deviation for a given sub-band is high, meaning that the noise values are relatively more widely spread out, the height of the associated bar can be maintained or even increased by some amount. On the other hand, if the standard deviation for a given sub-band is low, meaning that the noise values within that sub-band are relatively consistent, the height of the associated bar in FIG. 6b can be lowered. Similarly, the heights of the bars in the bar graph can be weighted based on peak noise such that a sub-band having a high peak noise can be increased in height by some amount. In any case, weighting can be performed based on thresholds for the respective statistical values. Weighting can be applied based on individual statistical values or combinations of statistical values. The automatically selected sub-band can be accepted by the operator touching an Auto-Select button 780 or by touching any sub-band which he or she wishes to choose. The operator can override the automatic selection, for example, based on which specific transmitters are currently available for performing the inground operation. As another basis to present information to the operator, other statistical values can be presented. For example, overbars 781 (a number of which are individually designated) show the peak noise per sub-band. The operator may choose to avoid a sub-band that exhibits a particularly high peak noise level, even if the average noise for that sub-band is relatively low. For purposes of over-riding the automatic selection, the operator can touch a Manual Select button 782 and then touch a sub-band which he or she wishes to choose. In another embodiment, display 36 on the locator can display a plot, bar graph or any suitable form of display format that is derived from the spectral scan that is shown in FIG. 6a such that the operator is then allowed to manually select one of the sub-bands, for example, by touching the sub-band of choice on the display screen. In still another embodiment, locator 20 can allow the operator to initially enter information relating to the transmitters that are available for automatic selection of a sub-band that is covered by one of those transmitters, excluding sub-bands that are not available, in a manner that is consistent with the teachings of U.S. Pat. No. 8,729,901 which is commonly owned with the present application and hereby incorporated by reference in its entirety. FIG. 6b illustrates sub-bands that are not available, based on unavailable transmitters, using dashed lines. Conversely, solid lines indicate sub-bands that are available. In the present example, SB-1 and SB-5 through SB-7 are not available. In an embodiment, sub-bands can be excluded based on regulatory constraints. In this way, the portable device itself and the operator are not allowed to make frequency selections that would violate regulations in a particular jurisdiction. Such frequency restrictions can be predetermined by the manufacturer on a regional basis. In an embodiment, portable device 20 or some other component of the system such as, for example, drill rig 80 can be equipped with a GPS receiver that can establish the location of the inground operation and then look up the local frequency requirements.

Still referring to FIG. 6b, the display screen that is shown can remain "live" at least until the frequency selection process is completed. That is, the average noise per sub-band can be monitored and displayed, either alone or weighted by other statistical parameters, in real time for operator monitoring purposes. In this way, the operator can move the locator about while observing the average noise in the various sub-bands. For example, the operator can walk a planned borepath and monitor the noise along the borepath prior to beginning drilling. In this way, a sub-band that is particularly noisy at one or more points along the borepath can be avoided. If the operator so chooses, he or she can move the locator to a different point, for example, along the borepath and initiate a rescan of the noise across the entire bandwidth by selecting a rescan button 784. As discussed above, the noise environment can be characterized based on reception using one or more antennas. The operator can change the receiving mode using a button 786. For example, in one receiving mode, the bar chart of FIG. 6b can be presented based on reception along a single axis such as, for example, the X axis. In another receiving mode, the bar chart can be presented based on a vector sum produced from three orthogonal receiving axes. Button 786 can also be used to initiate the rebar mode and/or to toggle between the rebar and normal modes. In this regard, the appearance of display 36 can change, as will be seen at an appropriate point hereinafter. Once the operator changes receiving modes, rescan button 784 can initiate a new noise scan and present the noise values based on the selected receiving mode. The operator can switch between the various noise scanning modes at will. In an embodiment, the noise scan that forms the basis for the display of FIG. 6b can be a high resolution scan. In conjunction with performing the noise scan, a number of optimized, low noise frequencies can be selected automatically based on the number of symbol frequencies that is needed. For example, sixteen symbol frequencies and a depth frequency can be selected per sub-band. In an embodiment, during the presentation of live noise on the screen of FIG. 6b, noise per sub-band can be presented as an average of the noise values measured at each of the selected frequencies within each sub-band. It is noted that selection of rescan button 784 causes a new or updated selection of frequencies within each sub-band. Locator 20 can be configured to store sets of frequency selections that are associated with different measurement positions, for example, in memory 714 of FIG. 9a. Accordingly, the frequency selections are optimized for each measurement position such that different selections can be used at different times during the operation. The term "optimized" is intended to mean that the selected frequencies are chosen with the intent of avoiding interference based on one or more statistical parameters such as, for example, average noise, standard deviation and peak noise. The frequency selection sets can be communicated to the transmitter, for example, above ground using external communication connection 174 of FIG. 3. An inground transmitter can be commanded in any suitable manner to switch to a different set of frequency selections during the inground operation. For example, switching between the rebar and normal modes can be commanded based on a predetermined roll sequence of the drill string or by transmission of an electromagnetic signal from above ground for reception by transmitter 130 which is, in this case, configured as a transceiver. Some embodiments can use the drill string as an electrical conductor or can include a well-known wire-in-pipe arrangement such that data can be transmitted between the inground transmitter/transceiver and the drill rig. For example, the drill rig can send a command via the drill string to cause a switch between the rebar and normal modes. One embodiment to initially establish operation in either the rebar or normal mode is based on the orientation of the transmitter at startup when the batteries are installed. For example, one end of the transmitter can be oriented upward to establish the normal mode while orienting that same end downward establishes the rebar mode.

Figure 6C:
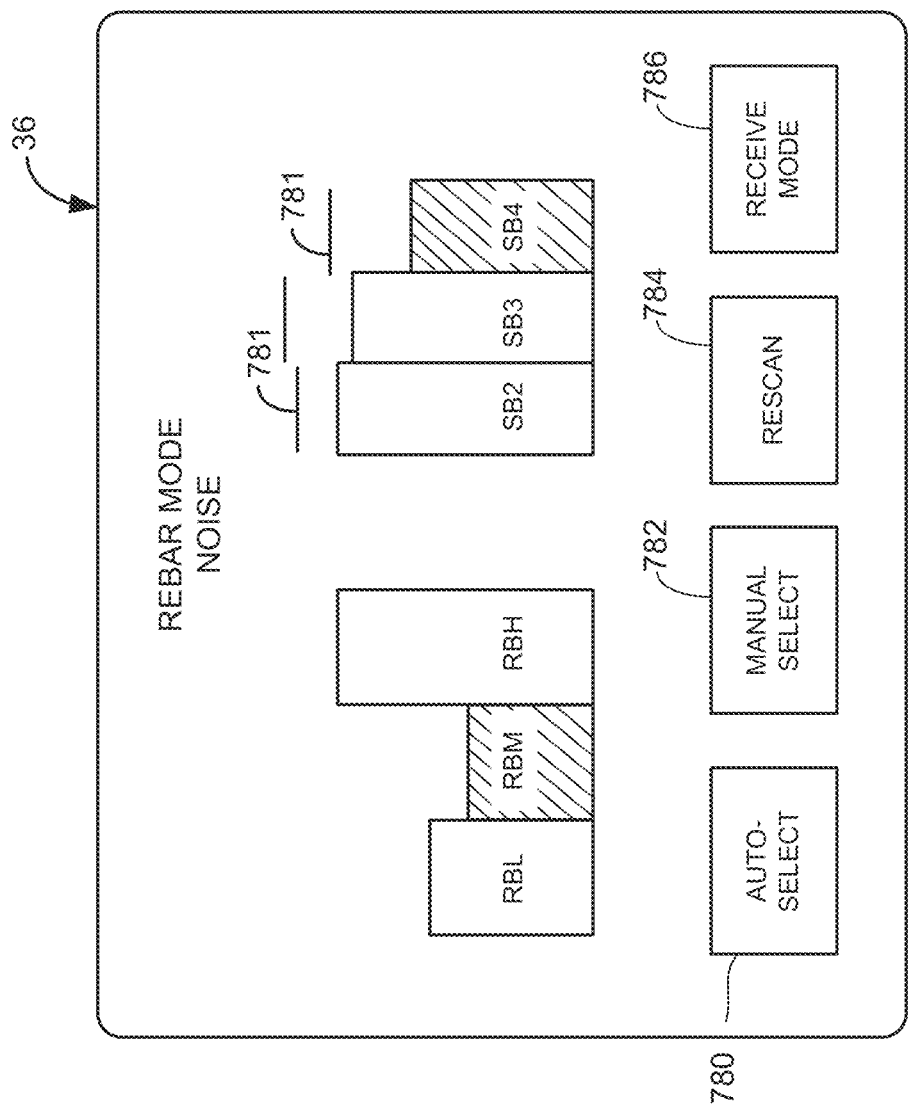
FIG. 6c is a diagrammatic illustration of another embodiment of a screen shot showing display 36 including a bar graph display illustrating measured noise for a noise scan in a rebar mode for the embodiment of transmitter bands shown in FIG. 5c.

FIG. 6c illustrates one embodiment of a screen shot showing display 36 including a bar graph illustrating noise measurement results for operation in the rebar mode wherein sub-band SB-4 is highlighted, for example, using hatching and/or color or in some other suitable manner to indicate that SB-4 has been automatically selected for purposes of data transmission. At the same time, bars 790, 792 and 794 are associated with rebar bands RBL, RBM and RBH, respectively. In this instance, the height of each column for the rebar bands shows the measured active noise for the lowest noise frequency, that can be referred to as a potential depth frequency, that was detected by scanning in each rebar band, whereas the columns for SB-2 through SB-4 can indicate an average value for the data symbol frequencies in each sub-band, as discussed above. Crosshatching or some other suitable visual expedient can indicate an automatic selection or a recommendation of the lowest noise frequency in the rebar bands which is RBM in the present example, although this is not required. The operator can select, override or change the selected rebar frequency, for example, by touching the band column. It should be appreciated that one noise scan of the entire bandwidth can be used to generate the screens of both FIGS. 6b and 6c, although this is not a requirement. Subsequent, to the noise scan, the display of FIG. 6c can present a live noise indication for each of the rebar bands such that, for example, the operator can walk the intended borepath and monitor the noise for variation therealong. In another embodiment, a plurality of depth frequencies can be transmitted. For example, the selected frequency for each of the RBL, RBM and RBH rebar bands can be transmitted in a sequence of intervals for above ground reception. It should be appreciated that such a plurality of frequencies can be selected in the normal mode and transmitted in a like manner. Reception of a plurality of depth frequencies will be discussed at an appropriate point hereinafter.

Figure 7:
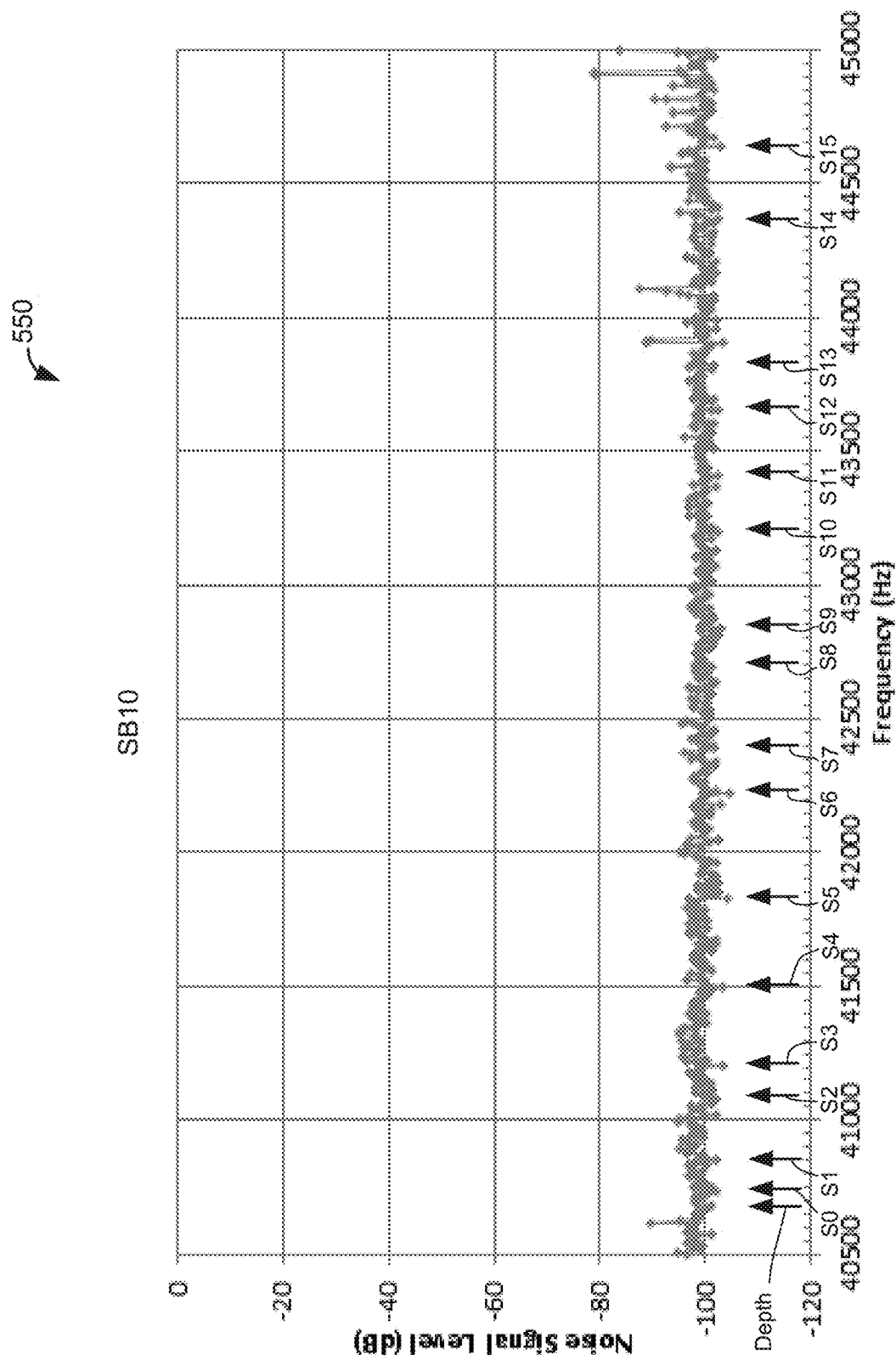
FIG. 7 is a further enlarged view of sub-band 10 from FIG. 6a, shown here to facilitate a discussion of the section of a depth frequency and symbol frequencies.

FIG. 7 is a further enlarged view of sub-band 10 from FIG. 6a, generally indicated by the reference number 550, and is shown here to illustrate the selection of a depth frequency and sixteen symbol frequencies S0-S15 within this sub-band for the normal mode. It is noted that the selection of symbol frequencies for data transmission in the rebar mode can be performed in a like manner, based on noise scans of the available frequency range for data transmission (sub-bands SB-2 through SB-4 in FIG. 5c), while the rebar depth signal frequency is separately chosen from rebar band set 424, as illustrated by FIG. 6c. In FIG. 7, each selected frequency has been designated by an arrow. The various frequencies have been selected, for example, based on their correspondence to low noise points in the noise plot. Based on the selection of frequencies, such as S0-S15 either automatically and/or manually, Applicants submit that system 10 can provide a level of noise immunity that has heretofore been unseen with respect to performing an inground operation such as, for example, horizontal directional drilling and related pull-back or back-reaming operations. The rebar mode disclosed herein is submitted to provide heretofore unseen capabilities in terms of immunity to passive interference. Related considerations and further details will be provided in the context of a discussion of device 20 which receives the depth signal and the data signal and which also can assist in the identification of the depth signal frequency and symbol frequencies to be used by the transmitter.

Figure 8:
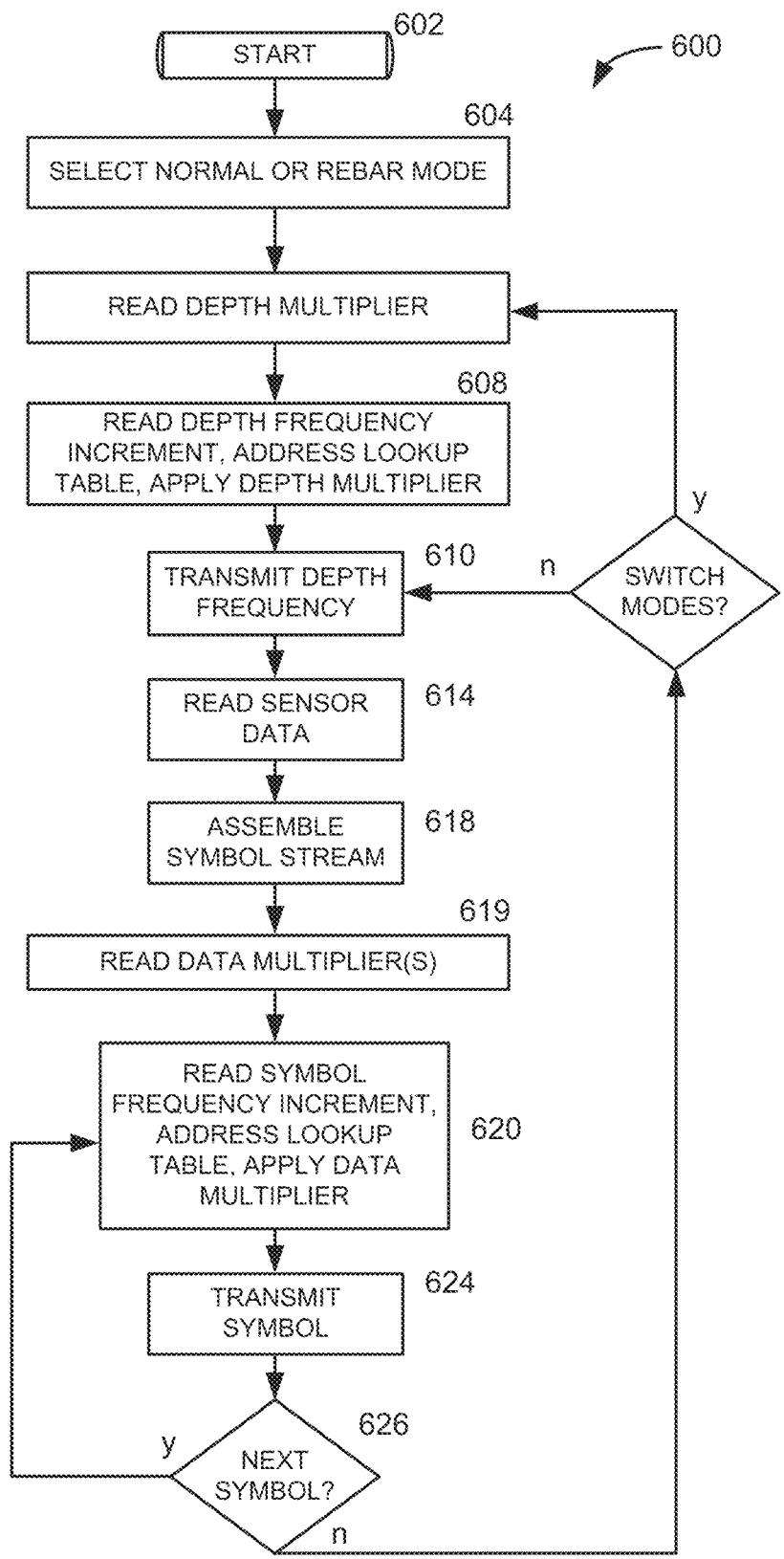
FIG. 8 is a flow diagram that illustrates an embodiment for the operation of a transmitter according to the present disclosure.

FIG. 8 is a flow diagram that illustrates an embodiment for the operation of a transmitter, generally indicated by the reference number 600, according to the present disclosure. It is noted that, for purposes of the present discussion, it will be assumed that the depth frequency as well as the frequencies associated with symbols S0-S15 have already been selected for each of the normal mode and the rebar mode. These frequency choices can be stored at any suitable location such as, for example, in depth frequency table 224 and symbol frequency table 228 of FIG. 3. The method begins at 602 and proceeds to 604 for selection of either the normal mode or the rebar mode in any suitable manner. At 606, the depth multiplier is read. At 608, the transmitter looks up the depth frequency increment, for example, from increment lookup table 370 (FIG. 4) as part of the operation of depth channel frequency control 338. In an embodiment that uses a single depth channel waveform lookup table such as table 326 in FIG. 4, depth channel phase accumulator 330 can always address that single waveform lookup table in conjunction with retrieving the appropriate multiplier value from a multiplier table (e.g., multiplier table 376 or 410). On the other hand, in an embodiment that uses a plurality of depth waveform lookup tables, step 608 also can identify the correct waveform lookup table such that depth channel phase accumulator 330 addresses the appropriate depth channel lookup table waveform based on frequency. At step 610, depth channel phase accumulator 330 begins counting based on the depth frequency increment, thereby causing lookup table 326 and depth channel PWM generator 350 to begin continuously generating depth channel frequency 386 to emit depth signal 120 at this frequency, subject to the multiplier value. At 614, CPU 200 reads sensor information via multiplexer 154 to collect sensor data that is to be transmitted. At 618, the CPU assembles the sensor data into a symbol stream which can invoke a packet structure that is yet to be described. The symbol stream is provided as data stream symbol input 374 to symbol channel frequency control 340 in FIG. 4. At 619, the depth signal frequency multiplier(s) can be read. At 620, the symbol channel frequency control can utilize lookup table 326 to identify the appropriate frequency for a current symbol to be transmitted as well as the multiplier value (e.g., multiplier table 376 or 410). On the other hand, in an embodiment that uses a plurality of symbol waveform lookup tables, step 620 also can identify the correct waveform lookup table such that symbol channel phase accumulator 334 addresses the appropriate symbol channel lookup table waveform. It should be appreciated that the transmission of a given symbol stream can necessitate that step 620 switches multiplier values on a symbol-by-symbol basis from one symbol to the next, based on frequency. At 624, the current symbol is transmitted. Step 626 checks for the availability of another symbol to transmit. If a symbol is available, operation returns to 620 such that the process repeats for the next symbol. On the other hand, if the next symbol is not yet ready, operation can be directed to 630 which responds to a request to switch from one of the normal and rebar modes to the other one of the normal and rebar modes. The request can be provided in any suitable manner, for example, based on a roll orientation sequence, data transmission via the drill string and wireless communication. If there is no request, operation can return to 610 which continues transmission of the depth signal. Sensor data is then again read at 614 and the process continues therefrom. On the other hand, if there is a request to switch bands operation returns to step 606 and proceeds therefrom. It should be appreciated that data signal 122 is most often transmitted on an essentially continuous basis simultaneously with depth signal 120.

Figure 9A:
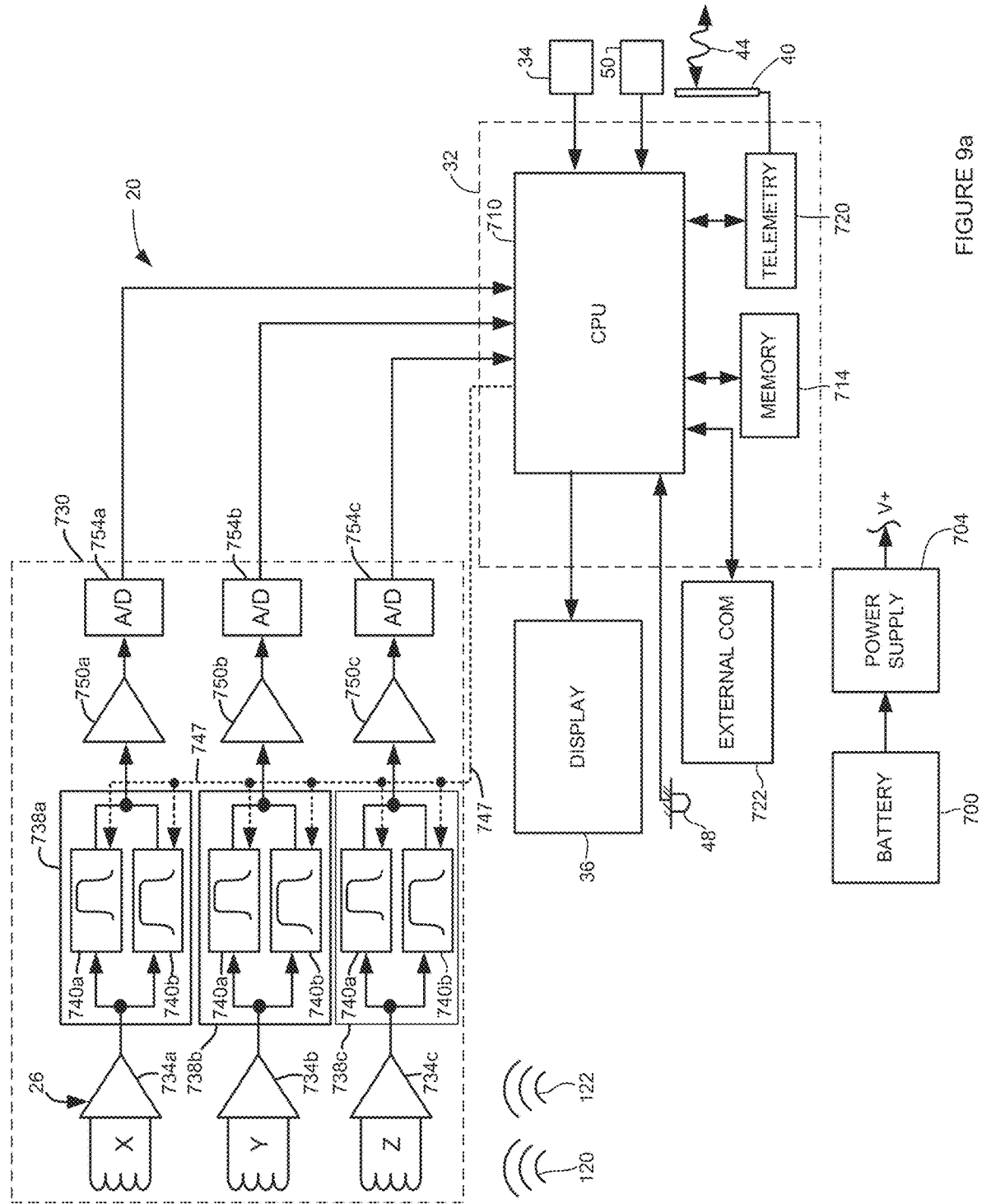
FIG. 9a is a block diagram illustrating an embodiment of the portable device shown in FIG. 1.

Having described embodiments of transmitter 130 in detail above, attention is now directed to FIGS. 9a-9c in conjunction with FIG. 1 for purposes of describing additional details with respect to device 20 which may be referred to interchangeably as a locator or receiver. FIG. 9a is a block diagram that illustrates device 20. The latter includes a battery 700 that feeds a power supply 704 which supplies appropriate electrical power to all of the components of the device, indicated as V+. Electronics section 32 includes a processor 710 that is interfaced with a memory 714. A telemetry section 720 is controlled by the processor and coupled to antenna 40 for bidirectional communication via signal 44. In some embodiments, the telemetry link can be unidirectional from device 20 to the drill rig, in which case transceiver 102 need only include receiver functionality. An external communication arrangement 722 provides for external communication with a transmitter using external communication connection 174 (FIG. 3) of the transmitter. As discussed above, such communication is not required to be transmitted through the ground but rather can be performed while the transmitter is above ground, for example, in a position adjacent to device 20. The external communication can be implemented in any suitable manner including but not limited to IrDA, NFC, Wi-Fi, Zigbee or Bluetooth. A wide-band dual mode front end 730 is configured for receiving depth signal 120 and data signal 122 using X, Y and Z antennas which make up antenna cluster 26 for measuring three orthogonal components of the subject signals as well as for performing noise measurements along these axes, as is yet to be described. Additional details with respect to an embodiment of the antenna cluster will be provided at an appropriate point hereinafter. Each of the X, Y and Z antennas is interfaced to a low noise amplifier (LNA) 734a, 734b and 734c, respectively, each of which can be identically configured. The amplified output of each LNA is supplied to a respective one of switchable filter sections 738a, 738b and 738c, each of which can be configured identically and which may be referred to collectively as filter sections 738. Each filter section includes two bandpass filters 740a and 740b exhibiting a low frequency roll-off or corner and a high frequency roll-off or corner. Filters 740a may be referred to as normal mode filters while filters 740b may be referred to as rebar mode filters. While filters 740a and 740b are illustrated as individual functional blocks, it should be appreciated that the filters can be implemented in any suitable manner. By way of non-limiting example, each filter can be implemented as a series of RC high-pass and low-pass filters that are distributed throughout the signal chain. The normalized frequency response of normal mode filter 740a is diagrammatically illustrated by a plot 742 in FIG. 9b. In an embodiment of the normal mode filter, two high-pass filters can each be set at a low corner frequency of about 4 KHz and four low pass filters can be set at a high corner frequency of about 90 KHz. This embodiment yields a relatively flat frequency response with a lower corner frequency 742a at about 10 KHz and a high corner frequency at about 50 KHz. The roll-off below 10 KHz is approximately 40 dB of attenuation per decade and the roll-off above 50 KHz is approximately 80 dB of attenuation per decade. FIG. 9c diagrammatically illustrates an embodiment of the normalized frequency response of rebar filter 740c indicated by the reference number 744. High corner frequency 743b can be unchanged, as illustrated, although this is not required. On the other hand, low corner frequency 745 can be moved downward, for example, to about 180 Hz at a rolloff of about 3 dB. In this way, there is little signal attenuation at 300 Hz. It should be appreciated that the low end response of filters 740a and 740b can be established in consideration of the fundamental and low order power line harmonics, which can be very strong particularly in the instance of the rebar mode filter. A filter switching line 747 is shown as a dotted line that extends from CPU 710 to each of the filters in filter sections 738. Accordingly, CPU 710 can control filter selection in the normal and rebar modes. Amplifiers 750a-750c can follow each respective one of filters 738a-738c with sufficient gain for purposes of driving each of analog-to-digital converters A/D 754a-754c. Each A/D 754 provides an output to CPU 710. In an embodiment, device 20 can be configured to receive the symbol stream in a way that suppresses powerline harmonic frequencies since there is effectively no energy present in the symbol stream at the powerline harmonics. For example, the received signal can be processed such that the receiver response matches the symbol spectra as illustrated by plot 553 of FIG. 7. In particular, the spectral response of the receiver can be matched to the spectral characteristics of the transmitter by integrating the received symbol stream over a time period that corresponds to the time duration or period of each symbol. In this way, the receiver frequency response matches the response of the transmitter with respect to exhibiting null reception points at the powerline harmonic frequencies. Accordingly, energy at the harmonic frequencies is suppressed or ignored by the receiver while sweeping up the spectral energy that is associated with the symbol. The receiver can employ any suitable demodulation process that provides periodic nulls including but not limited to a Discreet Fourier Transform (DFT).

Referring to FIGS. 9b and 9c, it is worthwhile at this juncture to compare the response 742 of the normal mode filter and rebar mode filter 744 in view of the spectral plot of FIG. 6a as well as in view of the discussions above with regard to high active noise below what Applicants submit to be an ultralow depth frequency range such as, for example, below 1 KHz. In this regard, low frequency corner 743a of the normal mode filter is positioned at approximately 4 KHz whereas low frequency corner 745 of the rebar mode filter is positioned no higher than approximately 180 Hz. While lowering the low frequency corner of the rebar filter allows for detection of the depth signal at very low depth signal frequencies at least down to 300 Hz or down to an appropriate powerline frequency, it should be appreciated that a serious technical challenge is simultaneously introduced. In particular and as seen in FIG. 6a, the rebar mode filter admits a large amount of noise between 180 Hz (or even lower) and 4 KHz that is normally rejected by the normal mode filter. This noise can contain, for example, very strong powerline harmonics. It is submitted that the admission of all this noise would be counter intuitive to one of ordinary skill in the art and would be perceived as likely to render the portable device as inoperable for purposes of receiving such low depth signal frequencies as well as introducing additional difficulty with regard to receiving higher frequencies. Applicants, however, recognize that the combined teachings herein provide for admitting this additional noise to enable the reception of very low frequency depth signals while, at the same time, providing the capability to position the depth signal at a precise frequency in the rebar bands that can be free of noise, at least to a reasonable approximation. In this way, the depth signal can be detected with some assurance of immunity to the generally high ambient noise levels below 1 KHz or some other suitable limit such as, for example, 1.5 KHz. Applicants are unaware of any suggestion of these combined features in the prior art.

Referring to FIG. 9a and having described an embodiment of locator 20 in detail above, it should be appreciated that the locator can be configured for performing noise measurements and analysis for purposes of selecting a transmitter for transmission of the depth signal and the data signal as well as establishing the frequencies to be associated with each of these signals. Of course, band selection may not be required when a wideband transmitter is used. Noise measurements can be determined based on each orthogonal axis of antenna 26 (X, Y and Z antennas, as shown in FIG. 9a). These individual noise components can be used to establish a three dimensional noise value, for example, based on a vector sum of the three antenna components. The vector sum can be useful since the noise reading at a given point will essentially be invariant with changes in the orientation of the locator. On the other hand, displaying the noise reading obtained from a single axis will generally exhibit variation at a given point as the orientation of the locator is changed. By allowing for monitoring noise along a single antenna axis such as for example the X axis, an operator can identify which particular axis along the bore path may be problematic in terms of interference. Noise values can be determined in any suitable manner such as, for example, based on a Fast Fourier Transform (FFT). In an embodiment, a noise scan can be produced from each axis for comparative purposes. For example, an axis that exhibits relatively higher noise than the other axes can be handled differently for purposes of data recovery.

Figure 10A:
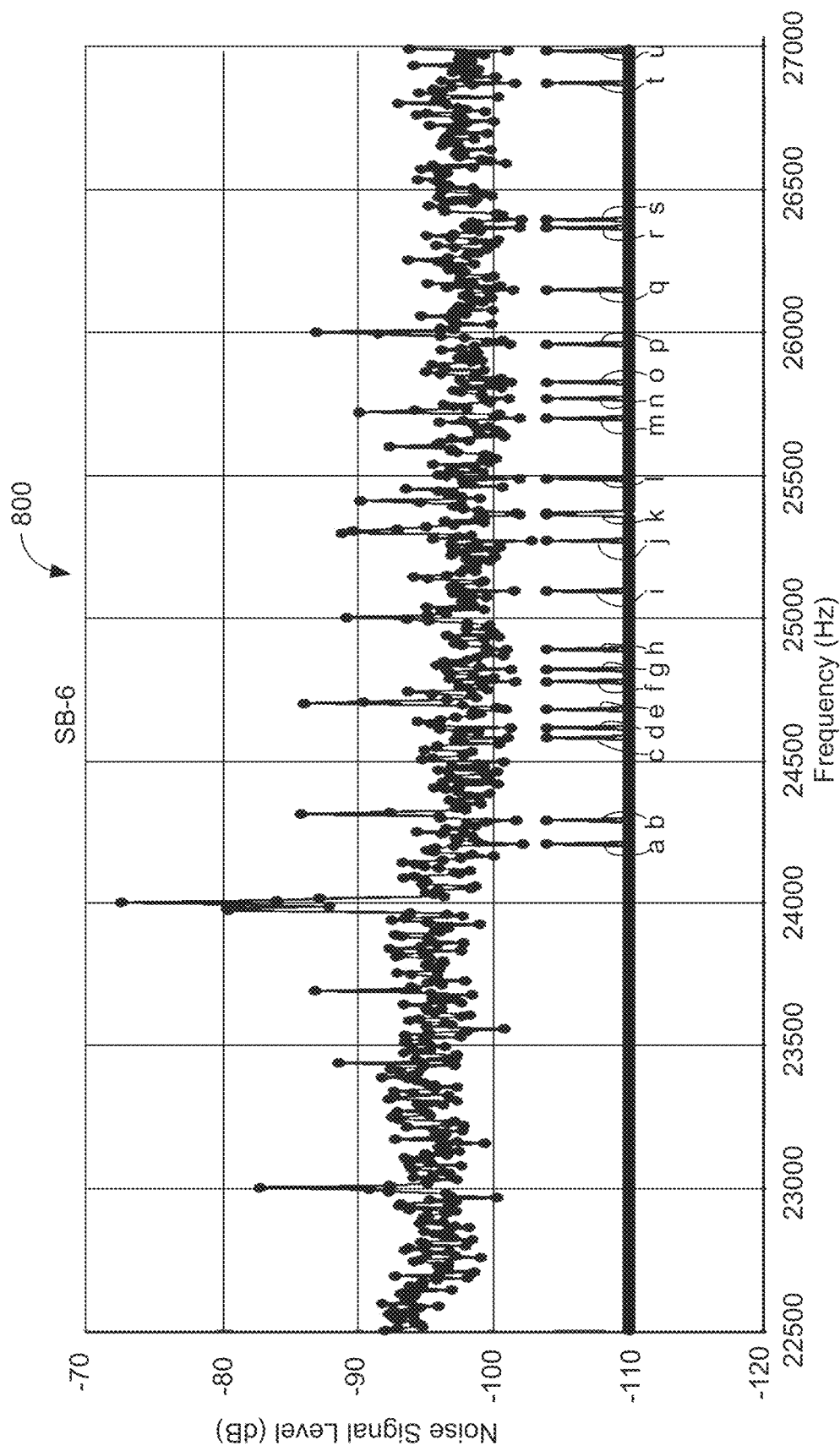
Figure 10B:
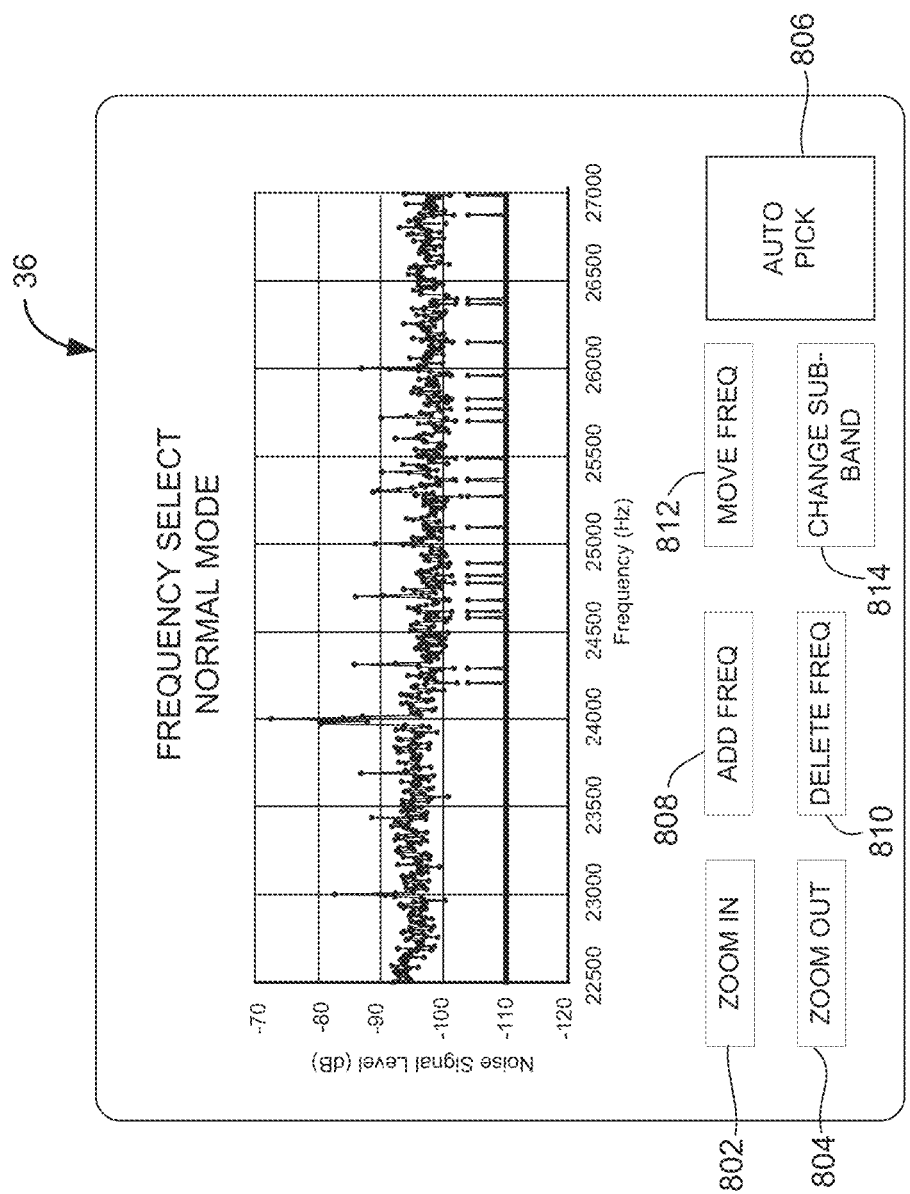
FIG. 10b is a diagrammatic illustration of one embodiment of a screen shot illustrating the appearance of sub-band 6 on a display screen for purposes of operator selection and modification of symbol frequencies, as well as other functions in accordance with the present disclosure.

Attention is now directed to FIG. 10a which is an expanded view of sub-band 6 from FIG. 6a, generally indicated by the reference number 800. For purposes of the present discussion, it will be assumed that SB-6 is available and has been selected either automatically or by the operator for use during the inground operation. It is noted that symbol/data frequency selection can proceed for any sub-band in accordance with these descriptions. Operation in the normal mode is assumed, at least initially. Having selected a sub-band, the frequencies for depth signal 120 and data signal 122 can be established. In an embodiment, the frequencies can be predetermined, for example, by the manufacturer or based on a previous noise scan, as described above. In another embodiment, display 36 can be used to represent the spectral plot of FIG. 10a, in any suitable form, to an operator of the locator such that the operator can make frequency selections. FIG. 10b illustrates one embodiment of a screen shot which shows display 36 illustrating SB-6, still assuming the normal mode. It should be appreciated that the locator can provide a zoom function on display 36 that uses Zoom In button 802 and Zoom Out button 804 such that the operator can expand the horizontal extents of the spectral display to provide for detailed frequency selection. Generally, the operator can select frequencies that correspond to low noise points on the displayed spectrum. The selections can be rounded to reflect the frequency resolution of the transmitter that is to be used. As discussed above, embodiments of transmitters according to the present disclosure can have a frequency resolution of 5 Hz, by way of non-limiting example. Twenty-one low noise points are identified on FIG. 10a indicated as upticks (a)-(u). In an embodiment using one depth frequency for depth signal 120 and 16 symbol frequencies, seventeen of these 21 frequencies can be utilized. As described above, the depth frequency can be located at any position within the sub-band, intermingled with the symbol frequencies, at either end of the sub-band or even in a different sub-band. As one example, the depth frequency can be selected as the lowest noise point among the identified frequencies, which is frequency (j) in the present example. In still another embodiment, the frequencies can be automatically picked or re-picked by locator 20, for example, responsive to the operator selecting an "Auto-Pick" button 806 on display 36. In one embodiment, processor 710 can examine the spectrum of FIG. 6a to identify the lowest noise points until a suitable number of symbol frequencies is available. In other embodiments, the processor can perform the selection process based on any suitable method. For example, the lowest noise frequencies can be selected in conjunction with maintaining a minimum separation between adjacent frequencies. With regard to the rebar mode, the frequency selection can include selections for data symbols that can be essentially identical in terms of the display of FIG. 10b with an additional selection of the depth frequency, for example, in rebar band set 424 which can be based on a display of rebar bands 424, as seen in FIG. 6c or a display of noise scan results for the rebar band set or some portion thereof which can have an appearance that is similar to or based on FIG. 10b. In this way, the operator is provided with a great deal of flexibility for purposes of selecting the depth frequency in the rebar mode.

Still referring to FIG. 10b, a frequency can be added, for example, by touching an Add Frequency button 808 and then touching the spectral plot. A frequency can be deleted, for example, by touching a Delete Frequency button 810 and then touching the frequency to be deleted. A frequency can be moved, for example, by touching a Move Frequency button 812 and then touching and dragging the frequency to be moved. The selected sub-band can be changed by touching a Change Sub-Band button 814. As will be further described immediately hereinafter, frequency selection is not limited to identification of low noise points but also can consider high noise points or areas of the spectral scan.

Figure 11:
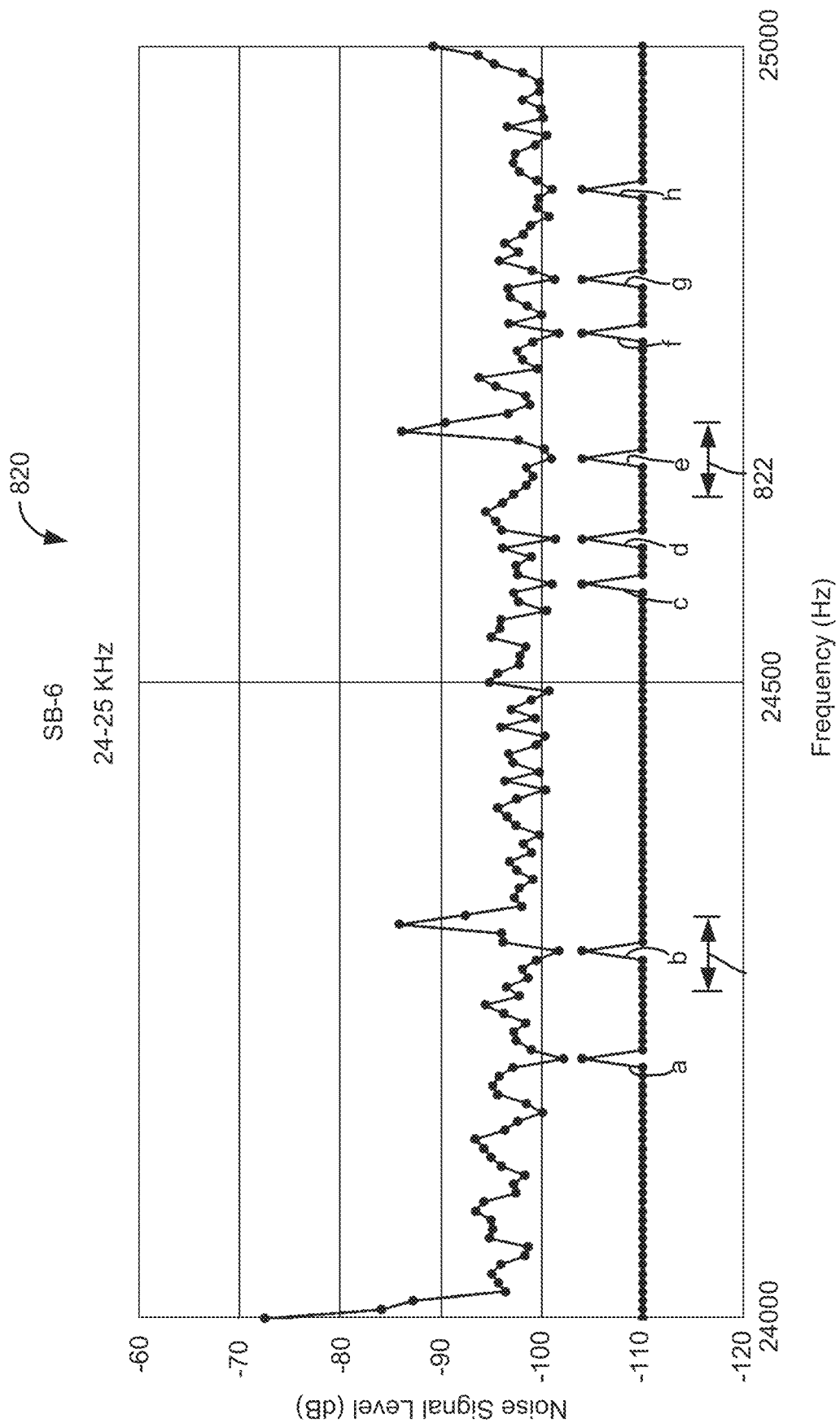
FIG. 11 is a further enlarged view of a portion of sub-band 6 of FIGS. 10a and 10b, shown here for purposes of describing further details with respect to symbol frequency selection.

FIG. 11 is a further expanded view of the spectral region of FIG. 10a from 24 KHz to 25 KHz, generally indicated by the reference number 820 and shown here for purposes of describing further details with respect to frequency selection. In addition to identifying low noise points, as described with regard to FIG. 10a, processor 710 can apply what can be referred to as a "keep-out region". The later will exclude any identified low noise frequency having a noise peak within a selected frequency window 822 that is centered on that low noise frequency. The noise can be identified, for example, based on a magnitude that exceeds a threshold 824 based on the average noise value for the sub-band and/or the noise value associated with the nearby low noise point. In an embodiment, the frequency window can be approximately 60 Hz (+/−30 Hz) in width and the threshold can be 10 dB or more above the associated low noise point. Based on the use of such a frequency window, frequencies (b) and (e) can be excluded due to the proximity of peaks 826 and 830, respectively. In the event that more frequencies are needed, processor 710 can re-examine the spectrum of FIG. 11 for purposes of identifying a new set of frequency candidates. In the rebar band set, a rebar frequency window can be of a different width than the frequency window in the normal mode. For example, the rebar frequency window can be more narrow since noise scanning can be performed at a small increment such as, for example, 5 Hz.

Figure 12A:
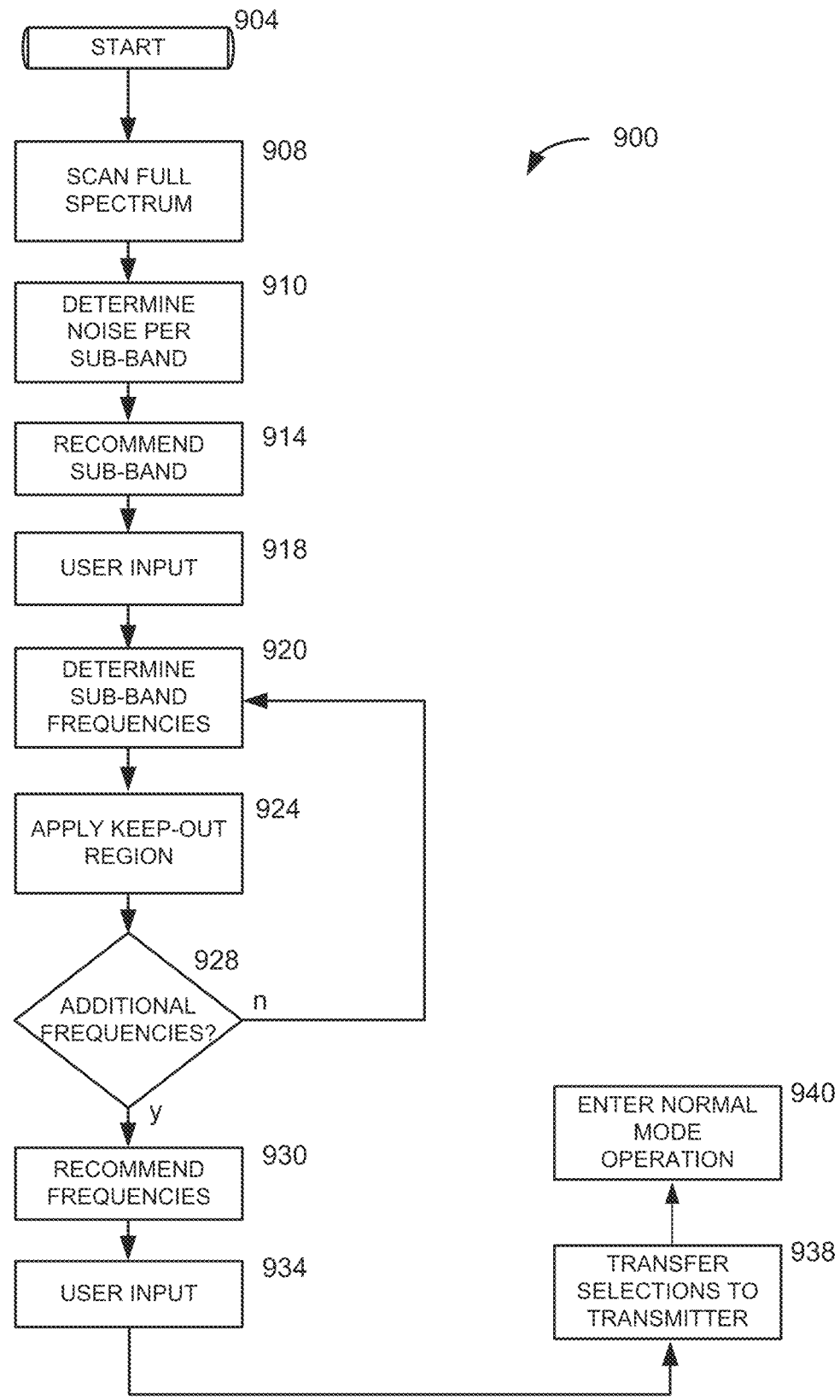
FIG. 12a is a flow diagram illustrating an embodiment of a method for operating a portable device in accordance with the present disclosure for purposes of spectral scanning and symbol frequency assignment for operation in a normal mode.

FIG. 12a is a flow diagram that illustrates an embodiment of a method, generally indicated by the reference number 900, for the operation of locator 20 in performing spectral scanning and frequency assignment for subsequent operation in the normal mode in accordance with the present disclosure. The method begins at 904 and proceeds to 908 which performs a scan of the full frequency spectrum, for example, from 0 Hz to 45 KHz for the present embodiment, although any suitable range can be used for this scan. The scan can be a high-resolution scan, for example, utilizing a resolution of 5 Hz, as discussed above. In another embodiment, an initial, lower resolution scan can be utilized such that the resolution is just sufficient to establish an average noise value for each sub-band. If the sub-band selection process relies on a lower resolution spectral scan, a high resolution spectral scan can subsequently be performed as part of the frequency selection procedure, described below. When a wideband transmitter will be used for the inground operation, a single high resolution scan can be employed for frequency selection purposes. At 910, the average noise value per sub-band is determined. At 914, a sub-band can be recommended based on the average noise values. Generally, the sub-band having the lowest average noise value can be recommended, although other embodiments can utilize different recommendation protocols and/or automated selection. For example, the sub-band having the lowest noise peak value can be recommended. By way of another example, as discussed above, more than one sub-band can be recommended. At 918, user input can be requested on display 36 wherein the user can accept the recommended sub-band or choose a different sub-band. For example, the user may choose a different sub-band based on an awareness of transmitters that are available for performing the inground operation. As discussed above, this information can serve as an initial input such that method 900 excludes sub-bands that are not covered by the currently available transmitter(s). Once the sub-band has been selected, the method proceeds to 920 which determines the sub-band frequencies. In an embodiment, the sub-band frequencies can be predetermined and stored in memory 714 of the locator or in memory 218 of the transmitter. In another embodiment, the sub-band frequencies can be determined by the operator on-the-fly by presenting the sub-band on display 36, as discussed above. In another embodiment, the sub-band frequencies can be determined automatically in accordance with the discussions relating to FIGS. 10a-10c and 11 with or without the application of a keep-out window, as applied by step 924. In the instance of the use of a wideband transmitter for performing the inground operation, steps 910 and 914 are not required since the entire transmission bandwidth can be available for frequency selection without the need to confine the frequencies to any particular sub-band(s) and step 920 can allocate frequencies across the entire transmission bandwidth. Accordingly, transmission frequencies can be selected automatically across the entire available bandwidth and/or customized by the user based on a high resolution noise scan without the need for frequency assignment limitations based on sub-bands. It should be appreciated that an embodiment of a wideband transmitter can be configured to operate, for example, based on operator preference, using sub-bands in the same manner as sub-band limited transmitters wherein frequency assignment can be confined to one or more sub-bands, although this is not required. At 928, a determination is made as to whether a sufficient number of frequencies have been identified. If not, operation returns to 920 for identification of additional frequencies. If a sufficient number of frequencies have been identified, operation proceeds to 930 which recommends frequencies for depth signal 120 and data signal 122. This latter step may be optional in a fully automated embodiment. At 934, information can be presented on display 36 for purposes of gathering user input, for example, approving the frequency selections or changing the frequency selections. For instance, the user may prefer to move the depth frequency to a different location within the sub-band or to an altogether different sub-band. Of course, in a wideband transmitter embodiment, no restrictions need be imposed with respect to limiting frequency selection to a particular band and/or sub-band. At 938, the frequency selections can be transferred to transmitter 130 using external communication arrangement 722 of the locator and external communication link 174 (FIG. 3) of the transmitter. Normal mode operation can then be entered during the inground operational procedure at 940.

In an embodiment of method 900, the number of frequencies that is selected can be based on the noise environment. For example, if a noise scan, whether sub-band limited or not, shows a low noise environment, relatively more frequencies can be selected. In this case, 32 or more symbol frequencies can be used instead of 16 symbol frequencies. If the noise scan shows a high noise environment, relatively fewer symbol frequencies can be used such as, for example, 4 or 8 symbol frequencies instead of 16 frequencies. Generally, the use of relatively fewer frequencies can aid in avoiding variable noise sources in a high interference environment. On the other hand, using a higher number of symbol frequencies can increase data throughput.

Figure 12B:
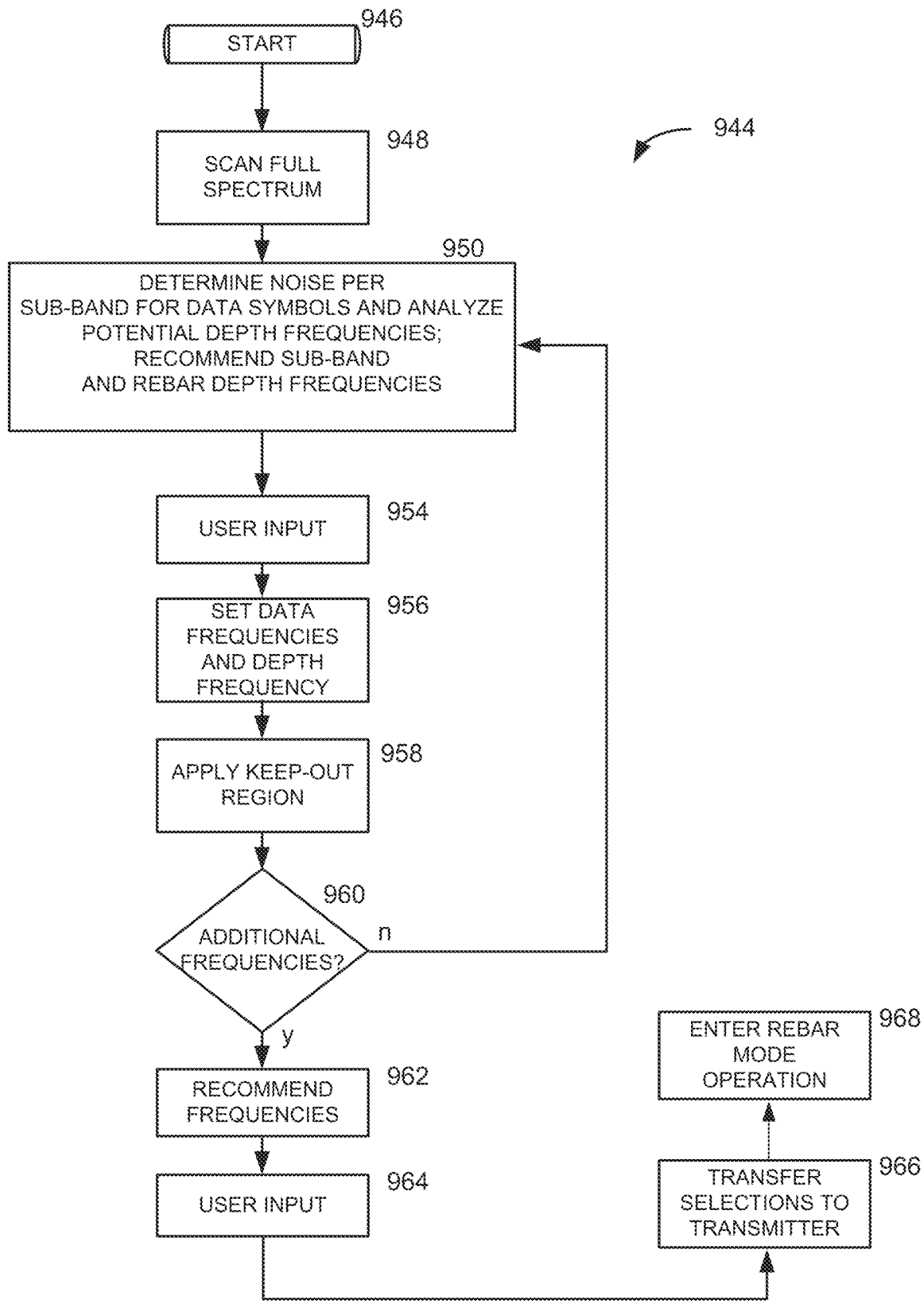
FIG. 12b is a flow diagram illustrating another embodiment of a method for operating a portable device in accordance with the present disclosure for purposes of spectral scanning and frequency selection for operation in a rebar mode.

FIG. 12b is a flow diagram that illustrates an embodiment of a method, generally indicated by the reference number 944, for the operation of locator 20 in performing spectral scanning and frequency assignment for subsequent operation in the rebar mode in accordance with the present disclosure. The method begins at 946 and proceeds to 948 which can perform a scan of the full frequency spectrum, for example, from 0 Hz to 45 KHz for the present embodiment, although any suitable range can be used for this scan. For example, based on FIG. 5c, the scan can be from approximately 0 Hz to 18 KHz. The scan can be a high-resolution scan, for example, utilizing a resolution of 5 Hz, particularly for rebar band set 424. Lower resolutions can be used for purposes of selecting symbol frequencies, as described above. At 950, the average noise value per sub-band can be determined for symbol frequency sub-bands and the scanned frequencies for potential use as the depth signal frequency can be analyzed. A sub-band for data symbols can be recommended and/or selected based on any suitable statistical value such as, for example, average noise values, minimum noise values, peak noise values and/or standard deviation values in a manner that is consistent with the descriptions above in conjunction with recommending one or more depth signal frequencies. At 954, user input can be requested on display 36 wherein the user can accept the recommended sub-band or choose a different sub-band for the data symbols. The user can also select, modify or confirm one or more potential depth signal frequencies. It is noted that user input can be optional in an automated embodiment that performs frequency selection for the user. Once the sub-band and depth signal frequencies have been selected, the method proceeds to 956 which sets the sub-band frequencies and the depth frequency. In an embodiment, the sub-band frequencies and depth frequencies can be predetermined and stored in memory 714 of the locator or in memory 218 of the transmitter. In another embodiment, the sub-band and/or depth frequencies can be determined by the operator on-the-fly by presenting the sub-band and/or the rebar bands on display 36, as discussed above. In another embodiment, the sub-band and/or depth frequencies can be determined and applied automatically in accordance with the discussions relating to FIGS. 10a-10c and 11 with or without the application of a keep-out window, as applied at 958 and discussed above.

It is noted that determinations and indications based on sub-bands in step 950 are not required, as discussed above, since there is no requirement to confine the frequencies to any particular sub-band(s) and step 950 can allocate frequencies across the entire transmission bandwidth. Accordingly, transmission frequencies can be selected automatically across the entire available bandwidth and/or customized by the user based on a high resolution noise scan. It should be appreciated that an embodiment of a wideband transmitter can be configured to operate, for example, based on operator preference, using sub-bands in the same manner as sub-band limited transmitters wherein frequency assignment can be confined to one or more sub-bands, although this is not required. At 960, a determination is made as to whether a sufficient number of frequencies have been identified. If not, operation returns to 950 for identification of additional frequencies. If a sufficient number of frequencies have been identified, operation proceeds to 962 which recommends frequencies for depth signal 120 and data signal 122. This latter step may be optional in a fully automated embodiment. At 964, information can be presented on display 36 for purposes of gathering user input, for example, approving the frequency selections or changing the frequency selections. For instance, the user may prefer to move the depth frequency to a different location within a rebar band or to an altogether different rebar band. Of course, in a wideband transmitter embodiment, no restrictions need be imposed with respect to limiting symbol frequency selection to a particular band and/or sub-band. Once again, there is no requirement for user input in an automated embodiment. At 966, the frequency selections can be transferred to transmitter 130 using external communication arrangement 722 of the locator and external communication link 174 (FIG. 3) of the transmitter. The rebar mode can then be entered at 968 during the inground operational procedure.

Figure 12C:
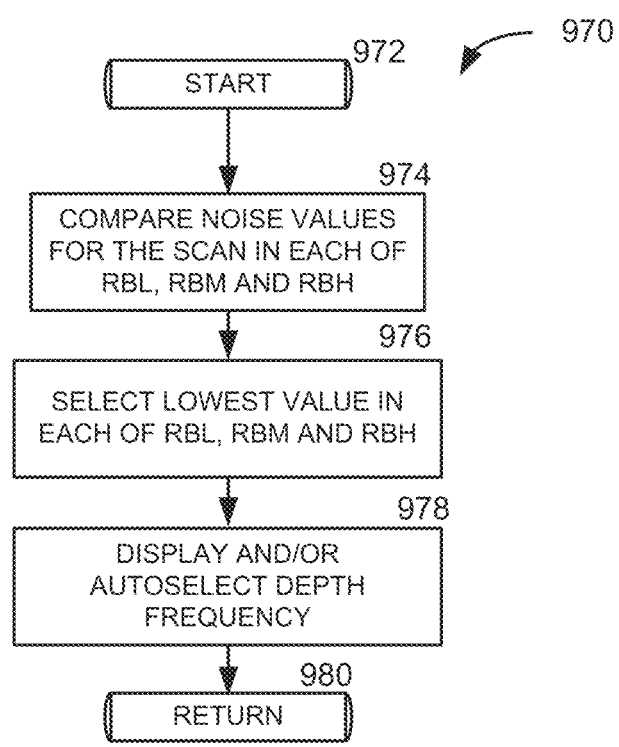
FIG. 12c is a flow diagram illustrating yet another embodiment of a method for operating a portable device in accordance with the present disclosure for purposes of spectral scanning and frequency selection for operation in the rebar mode.

Attention is now directed to FIG. 12c in conjunction with FIG. 12b. FIG. 12c is a flow diagram that illustrates an embodiment of a method for step 950 of FIG. 12b, generally indicated by the reference number 970, for purposes of analyzing the scanned frequencies in the depth band(s). The method begins at start 972 and proceeds to 974 which compares the noise values obtained from the noise scan for each of rebar bands RBL, RBM and RBH of FIG. 5c to identify, at 976, at least the frequency in each of these rebar bands that exhibits the lowest noise value. In this embodiment, the result is a set of three low noise potential depth signal frequencies. At 978, the set of low noise frequencies can be displayed to the user, for example, based on the screen of FIG. 6c, and/or an auto-select of the lowest noise frequency from the set can be performed. At 980, operation can return to step 950 of FIG. 12b.

Figure 12D:
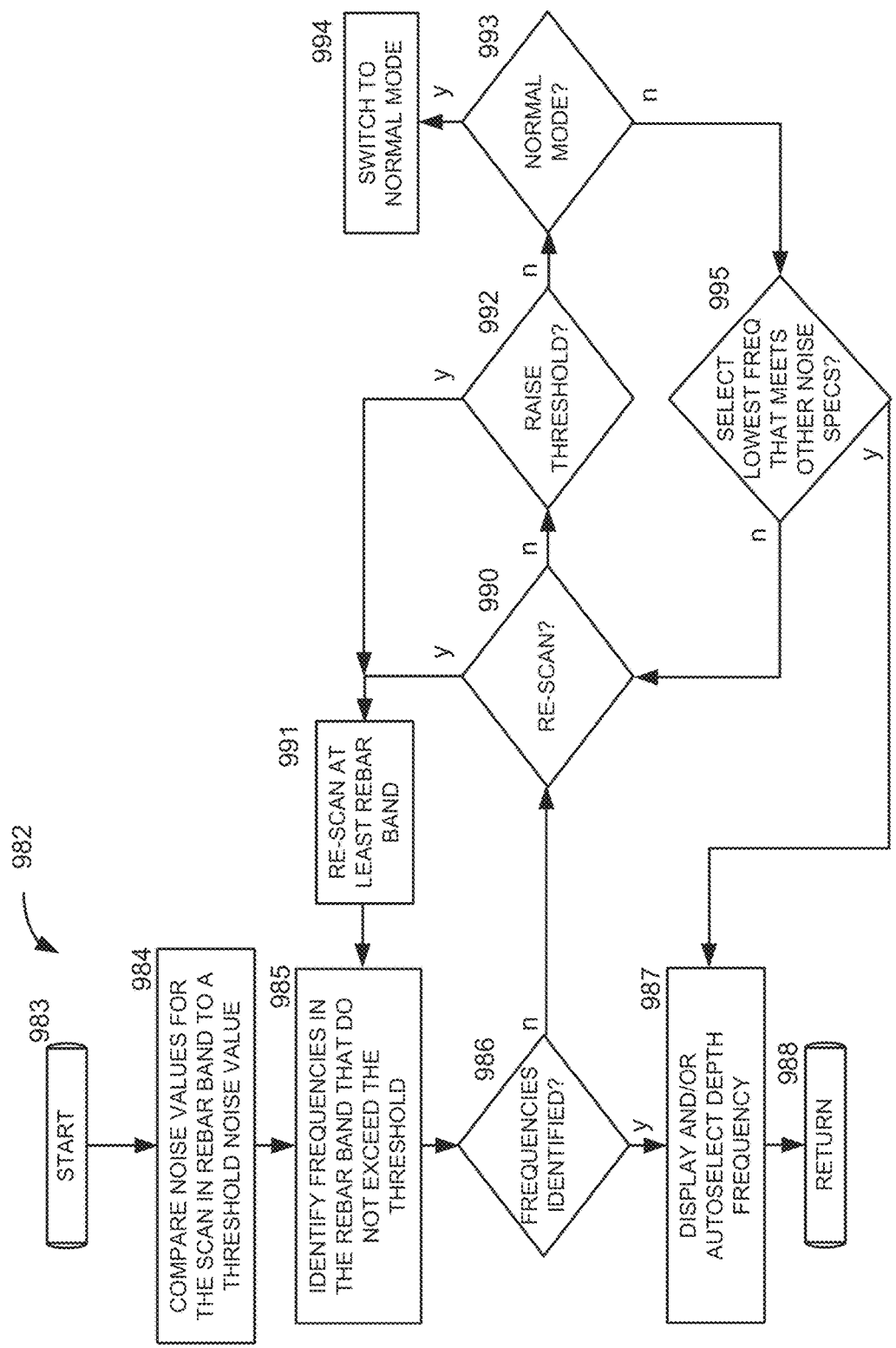
FIG. 12d is a flow diagram illustrating still another embodiment of a method for operating a portable device in accordance with the present disclosure for purposes of spectral scanning and frequency selection for operation in the rebar mode.

Turning now to FIG. 12d in conjunction with FIG. 12b, the former is a flow diagram that illustrates another embodiment of a method for step 950 of FIG. 12b, generally indicated by the reference number 982, for purposes of analyzing the scanned frequencies in the depth band(s). The method begins at start 983 and proceeds to 984 which compares plurality of noise values obtained from the noise scan for the overall rebar noise band or range to a threshold noise value. The latter can at least initially be a low value for reasons that will be evident in view of the continuing discussion. At 985, low noise frequencies are identified that do not exceed the threshold. Step 986 tests whether any frequencies were identified, as a result of the low value for the noise threshold. If frequencies were identified, operation branches to 987 which can display, auto-select and/or confirm the depth signal frequency with cooperation from the operator as desired. At 988 operation returns to step 950 of FIG. 12b. If, on the other hand, no frequencies were identified at 986 since all the scanned frequencies exhibited noise levels above the threshold noise level, operation branches to 990, which can query the operator to trigger a re-scan of the noise at least in the rebar band. It is noted that decision 986 is not a requirement. In this regard, any suitable response to excess or severe active interference can be provided. For example in another embodiment, an indication can be issued to the operator that there is severe noise present in the rebar band. In the present embodiment, if a rescan is selected, operation proceeds to re-scan at 991 with a subsequent return to 985. If the user does not request a re-scan at 990, operation can proceed to 992 which queries whether the user would like to raise the noise threshold. If so, the noise threshold can be increased, for example, by a predetermined incremental amount or the user can specify the increase. Operation can then return to 991 and proceed therefrom. If the user does not choose to increase the noise threshold at 992, operation can move to 993 which queries whether the user would like to leave the rebar mode and enter the normal mode, assuming that there is too much local active noise in the ambient operational environment. If the user selects to return to the normal mode, the normal mode is entered at 994 which can invoke, for example, method 900 of FIG. 12*a*. On the other hand, if the user does not choose to enter the normal mode at 993, operation proceeds to 995 which is not required but involves selecting the depth signal frequency based on meeting a different set of noise specifications. Operation then proceeds to 987. One embodiment for step 995 can be seen in FIG. 12*e*, as described immediately hereinafter, although the procedure of FIG. 12*e* can be entered independent of method 982 of FIG. 12*d*.

Figure 12E:
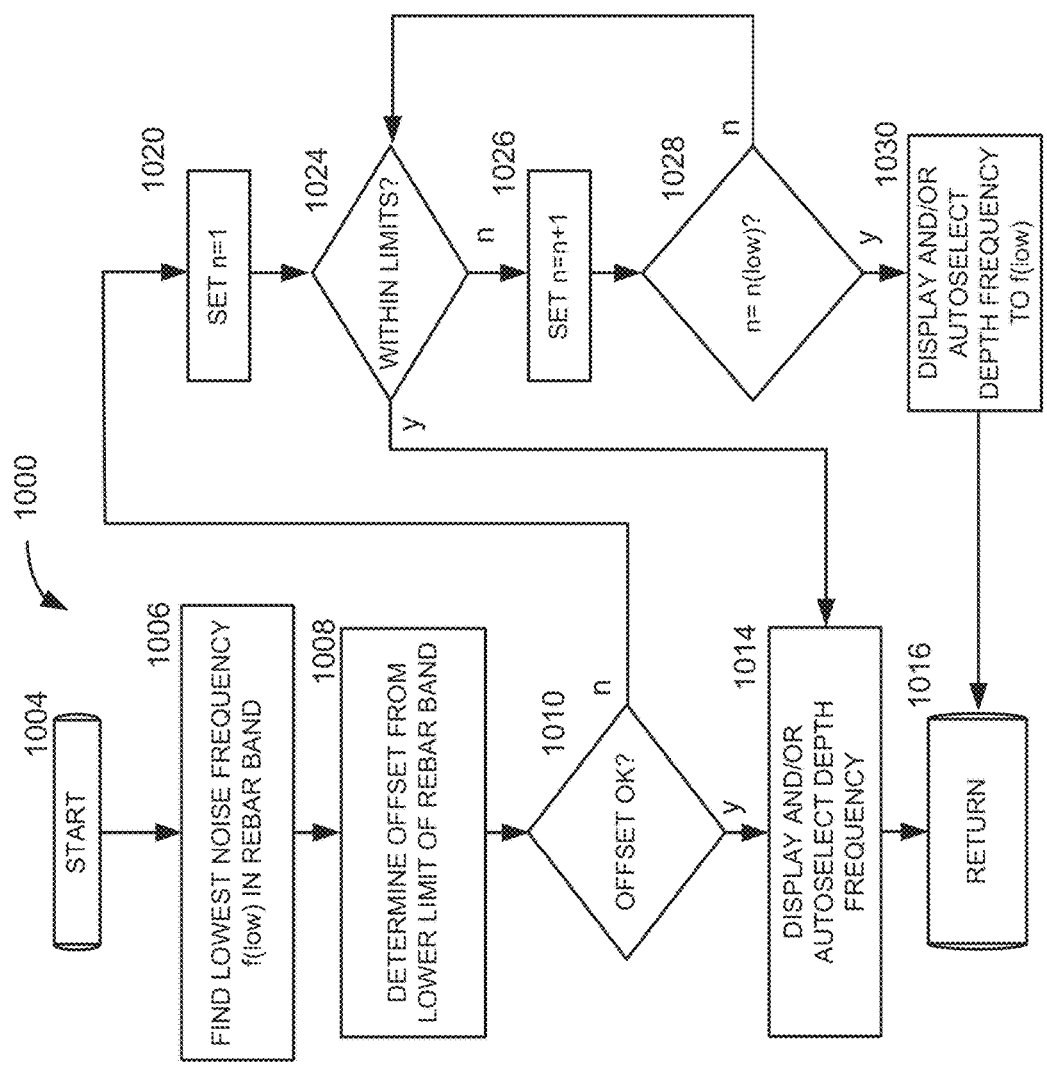
FIG. 12e is a flow diagram illustrating yet another embodiment of a method for operating a portable device in accordance with the present disclosure for purposes of spectral scanning and symbol frequency for operation in the rebar mode.

Reference is now made to FIG. 12*e*, which illustrates another embodiment of a method for step 950 of FIG. 12*b*, generally indicated by the reference number 1000 or which can serve as step 995 in FIG. 12*d* for purposes of analyzing the scanned frequencies in the depth band(s). It is noted that method 1000 can serve as a primary embodiment for identifying a depth signal frequency and/or as a further vetting procedure (step 995 of FIG. 12*d*) to ensure that an identified frequency is as low as practical, as will be made evident in the descriptions that follow. In this regard, it is noted that passive interference immunity is generally enhanced with decreasing frequency such that it can be beneficial to employ the lowest practical frequency. The method begins at start 1004 and proceeds to 1006 which finds the lowest noise frequency, f(low), in the rebar band based on the noise scan, for example, at a 5 Hz increment. At 1008, although this is not required, an offset from the lower limit of the rebar band can be determined. At 1010, the offset can be compared to a threshold offset which would indicate that f(low) is already sufficiently close to the lower limit of the rebar band. If the offset is determined to be acceptable, the identified low noise frequency can be indicated and/or auto-selected at 1014. At 1016, the procedure can return, for example, to an overall frequency selection procedure that also selects symbol frequencies such as, for example, 950 of FIG. 12*b*. On the other hand, if 1010 determines that the offset is too high, operation can route to 1020 which sets an index value, n, that counts the frequency increments for the noise scan of the rebar band starting at the lower limit (n=1) of the rebar band and ending at n(low) which is the value of n at f(low). At 1024, if the noise value for the frequency identified by the current value of n is within limits, operation can proceed to 1014. It is noted that acceptable limits can be defined in any suitable manner such as, for example, no more than some specified amount above the measured noise at f(low). If the noise is not within limits, operation is routed to 1026 which increments n. Step 1028 then tests whether the current value for n is equal to n(low). If so, step 1030 can display and/or auto-select f(low) as the depth signal frequency. Thereafter, operation can return to step 950 of FIG. 12*b*. If the value of n at step 1028 is less than n(low), operation returns to 1024 for comparison of the noise value at the indicated frequency to acceptable limits, as discussed above. In this way, a loop is formed which tests every incremental scanned depth frequency, up to f(low), such that an acceptable frequency can be found that is lower than the actual lowest noise frequency within the rebar band.

Figure 13:
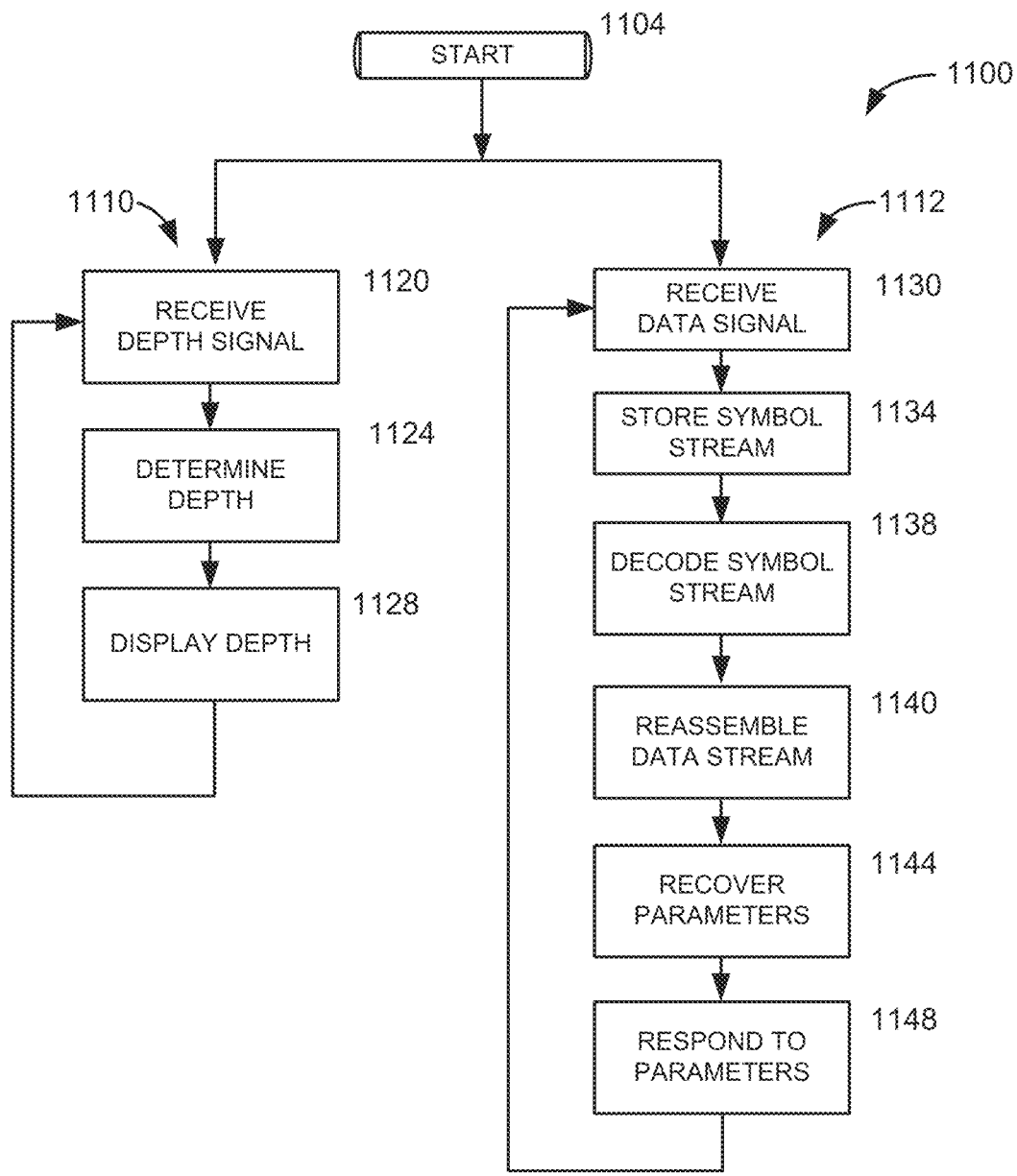
FIG. 13 is a flow diagram illustrating an embodiment of a method for operating a portable device in accordance with the present disclosure for receiving a depth signal and a data signal during an inground operation.

FIG. 13 is a flow diagram illustrating an embodiment of a method for operation of locator 20 during an inground operation, generally indicated by the reference number 1100. The method begins at 1104 and proceeds simultaneously along a depth determination branch 1110 and a data recovery branch 1112. Depth branch 1112 receives depth signal 120 at 1120 and then determines the depth of the transmitter at 1124. Because the depth signal is transmitted on a dedicated frequency, the depth signal is receivable on an essentially continuous basis throughout the inground operation. Accordingly, steps 1120 and 1124 repeat in a loop fashion throughout the normal operation mode of the locator. As described above, step 1124 can utilize the depth signal to determine the depth of the transmitter based on the dipole equations. In an embodiment, part of the depth determination can include compensation for the distance of the locator above the surface of the ground. In an embodiment for receiving a plurality of depth frequencies such as, for example, from the RBL, RBM and RBH bands (see FIG. 6*c*), it is noted that an average signal strength of the signals can be used for purposes of depth determination. Data recovery branch 1112 begins at 1130 with reception of data signal 122 in the form of a symbol stream that can be made up of multi-bit symbols. At 1134, the symbol stream can be temporarily stored for decoding, for example, in memory 714 (FIG. 9*a*). At 1138, processor 710 decodes the symbol stream. In this regard, one of the symbols can be used as a synchronization symbol that can identify the start of a packet structure. In an embodiment that uses a 4 bit symbol (i.e., 16 symbol frequencies), a seventeenth symbol frequency can be added for purposes of representing a synchronization symbol in the symbol stream. One suitable packet structure, by way of non-limiting example, can be represented by a series of 4-bit variables as S, P1, R1, P2, R2, BT1, BT2, R3 wherein S has a fixed value that corresponds to the sync symbol, P1 is a variable representing the first four bits (0-3) of a pitch value, R1 is a first roll variable characterizing the roll orientation, P2 is bits 4-7 of the pitch value, BT1 is a first four bits (0-3) of battery and temperature data, BT2 is bits 4-7 of battery and temperature data, and R3 is a third roll variable. In this regard, it should be appreciated that the pitch value is accumulated based on two different variables corresponding to two symbols in the symbol stream that are separated by another symbol. That is, the four bits of P2 can be appended to the four bits of P1 to represent a complete pitch value. Still further bits can be appended based on another pitch variable, if desired. Similarly, 8 bits of battery and temperature data can be assembled based on two successive variables BT1 and BT2. At 1140, a data stream can be reassembled based on the decoded symbol stream to reconstruct the original data that was the basis for the symbol stream in transmitter 130. At 1144, processor 710 recovers parameters from the data stream. These parameters can represent orientation parameters such as pitch and roll, temperature, pressure, battery voltage and current, and any other data that is of interest. At 1148, processor 710 responds to the recovered parameters in any suitable manner such as, for example, by driving display 36 to indicate pitch and roll, battery status, temperature and pressure and/or as inputs for other processes such as, for example, providing warnings when thresholds relating to temperature and pressure have been violated. Operation then returns to step 1130.

At this juncture, it is appropriate to consider further details with regard to the operation of transmitter 130 during an inground operation. Embodiments of the transmitter can flexibly allocate transmission power between the various frequencies that are transmitted such as, for example, between the frequencies that are shown in Tables 3 and 4. In one embodiment, each frequency can be allocated an equal amount of transmission power. In another embodiment, transmission power can be allocated non-uniformly among the frequencies. For example, one or more frequencies can be assigned a higher transmission power than another group of frequencies. In still another embodiment, each frequency can be assigned a different transmission power. Such power allocation can be performed in any suitable manner. For example, portable device 20 of FIGS. 1 and 9 can be configured to monitor the average signal strength associated with each frequency as each frequency is received during normal operation. Transmission power can then be reallocated on-the-fly among the frequencies based on a running average signal strength. For example, a sudden decrease in signal strength of a given frequency can be attributable to interference such that additional power can be allocated to that frequency. In some embodiments, low noise frequencies can be allocated relatively lower transmission powers while higher noise frequencies can be allocated relatively higher transmission powers. The reallocated transmission power values can be transferred to transmitter 130 in any suitable manner. For example, portable device 20 can transmit the reallocated power scheme to drill rig 80 via telemetry signal 44. The drill rig can then transfer the new power scheme to transmitter 130 via the drill string by using the latter as an electrical conductor. In another embodiment, portable device 20 can be configured with an additional antenna 712 (FIG. 1) such as a dipole antenna for transmitting a signal for direct reception by transmitter 130. Modulation of this signal can be decoded by transmitter 130 to recover the new power scheme.

Referring again to FIG. 10b, power allocation among selected frequencies can also be performed during the frequency selection process or mode, prior to entering normal mode or rebar mode. For example, power allocation can be based on a noise value that is associated with each selected frequency, as shown in FIGS. 10a and 10b. Although the low noise frequencies identified in FIGS. 10a and 10d appear to exhibit relatively equal noise values for illustrative purposes, this may not necessarily be the case. If there is significant variation among the noise values for the lowest noise frequencies that are identified, transmission power can be allocated in a higher proportion to those frequencies exhibiting relatively higher noise values. Conversely, transmission power allocated to a very low noise frequency can be relatively low to allow for additional power allocation to one or more other frequencies. Transmission power can also be allocated in a manner that is consistent with the application of a keep-out window, as described above. For example, if a particular frequency is selected such that a powerline harmonic or other noise anomaly falls within a keep-out widow for that particular frequency, additional power can be allocated to the particular frequency. It should be appreciated that in any embodiment that uses allocated transmission power that can vary from frequency to frequency, such allocation can be performed based on overall power consumption, particularly when transmitter 130 is battery powered. In this way, the overall power consumption can be reduced or a target overall power consumption can be maintained.

Applicants recognize that transmission of the depth signal at low frequencies in the rebar mode, as disclosed herein, in relation to data symbol frequencies that are far greater, raises a particular concern. In this regard, as the depth signal frequency decreases relative to a given data signal frequency, even with no change in active interference and in the absence of any countermeasures, the range at which the depth signal can be received has been observed by Applicants to decrease relative to the range at which the data signal can be received. This can be very problematic during an operational procedure since locator 20 can lose reception of depth signal 120 well before loss of data signal 122. In order to ensure full system capability, it is necessary for the locator to receive both the depth signal and the data signal. While not intending to be bound by theory, Applicants believe that the low frequency reduction or decay in range is attributable to reduced coupling efficiency between the transmit and receive antennas. At the same time, the antenna behaves primarily as an inductor such that the impedance of the antenna decreases as frequency decreases. For a fixed drive voltage, current increases in an at least generally linear manner. Applicants have observed that the decay in the signal strength and thereby range of the depth signal is complex in nature. In embodiments, appropriate transmit powers, in order to compensate for the decay, can be characterized in any suitable manner such as, for example, empirically. A multiplier table can compensate for this coupling decay effect or a function can be determined, for example, based on curve fitting for use by the processor of the transmitter to set transmit power based on frequency. In order to maintain an at least approximately equal reception range for the depth signal and the data signal, one can provide, for example, for adjusting the depth signal up to at least approximately 100 times more power than the data signal. This adjustment can accommodate adjusting the power allocated to the data signal downward in order to accommodate rebalancing or shifting power to the depth signal while not violating the maximum power threshold or adjusting the power allocated to the depth signal downward while allocating additional power to the data signal for the same reason. As another example, for a depth signal frequency at 330 Hz and a data signal frequency at 18 KHz, the depth signal frequency can be provided with about 5 times the power of the data signal frequency. In view of these recognitions, Applicants bring to light an advanced system in which a processor of the transmitter is configured for generating the depth drive input at the depth signal frequency and for generating the data drive input, characterizing the sensor data, in a way that controls a depth signal transmit power in relation to a data signal transmit power such that a first reception range of the depth signal at least approximately matches a second reception range of the data signal even though the depth signal frequency is far lower (e.g., 1 KHz or less) than the data signal frequency. Stated in another way, compensation is applied by balancing transmit power between the depth signal and the data signal such that the reception range for both signals is at least approximately equal. At the same time, this balancing can accommodate a further requirement to manage total power consumption of the transmitter such that, for example, a specified maximum power consumption is not exceeded. In an embodiment, multiplier table 410 of Table 3 can be configured, at least approximately, based on the aforementioned decay characteristic, although this is not required. In Table 3, it should be apparent that the transmit power, based on the multiplier value.

The foregoing description of the invention has been presented for purposes of illustration and description. It is not intended to be exhaustive or to limit the invention to the precise form or forms disclosed, and other modifications and variations may be possible in light of the above teachings. Accordingly, those of skill in the art will recognize certain modifications, permutations, additions and sub-combinations of the embodiments described above.

What is claimed is:

1. A portable device as part of a system in which a transmitter is configured to move through the ground in a region during an operational procedure while transmitting a depth signal at a depth frequency and a data stream at one or more data frequencies that at least characterizes an orientation parameter of the transmitter, said portable device comprising:
   an antenna for receiving the depth signal and the data frequencies to produce an output;
   a switchable filter section for limiting the antenna output in a normal mode to one frequency band that is above a predetermined frequency to pass the depth signal and the data stream at one or more frequencies and for limiting the antenna output in a rebar mode to another frequency band to pass the depth signal at less than the predetermined frequency and the data stream including the one or more frequencies above the predetermined frequency; and
   a processor configured for switching the switchable filter section between the normal mode and the rebar mode to recover the depth signal and data stream responsive to selection of normal mode and the rebar mode.

2. The portable device of claim 1 wherein the switchable filter includes a normal mode filter for the normal mode and a rebar filter for the rebar mode.

3. The portable device of claim 1 wherein the predetermined frequency is 1 KHz.

4. The portable device of claim 1 wherein the rebar filter includes a rebar mode lower filter corner that is less than 1 KHz and the normal mode filter includes a normal mode lower filter corner that is greater than 1 KHz.

5. The portable device of claim 2 wherein the rebar filter defines a rebar passband that is wider in bandwidth than a normal mode passband that is defined by the normal mode filter.

6. The portable device of claim 5 wherein a first upper corner of the rebar passband at least approximately matches a second upper corner of the normal mode passband.

7. The portable device of claim 1 wherein said rebar band admits additional low frequency noise as compared to the normal mode band and wherein the portable device is further configured for scanning electromagnetic noise at least below said predetermined frequency to identify at least one low noise frequency for use by the transmitter as the rebar mode depth frequency in the rebar band to dynamically position the rebar mode frequency in relation to the additional low frequency noise.

8. The system of claim 1 wherein the portable device is configured for transmitting the identified low noise frequency to the transmitter to serve as the depth signal frequency.

* * * * *